US012603700B2

(12) United States Patent (10) Patent No.: US 12,603,700 B2

Govindassamy et al. (45) Date of Patent: Apr. 14, 2026

(54) SPACE COMMUNICATION PROTOCOLS

(71) Applicant: Antaris, Inc., Los Altos, CA (US)

(72) Inventors: Sivakumar Govindassamy, Los Altos, CA (US); Karthikeyan Govindhasamy, Los Altos, CA (US)

(73) Assignee: Astira, Inc., Los Altos, CA (US)

( * ) Notice: Subject to any disclaimer, the term of this patent is extended or adjusted under 35 U.S.C. 154(b) by 273 days.

(21) Appl. No.: 18/222,229

(22) Filed: Jul. 14, 2023

(65) Prior Publication Data

US 2024/0223269 A1 Jul. 4, 2024

Related U.S. Application Data

(60) Provisional application No. 63/389,318, filed on Jul. 14, 2022.

(51) Int. Cl.
H04B 7/185 (2006.01)

(52) U.S. Cl.
CPC ..... H04B 7/18584 (2013.01); H04B 7/18589 (2013.01); H04B 7/18593 (2013.01)

(58) Field of Classification Search
CPC ............ H04B 7/18584; H04B 7/18589; H04B 7/18593; H04B 7/18513; H04B 7/18569; G06F 2009/45587; G06F 2009/45595; G06F 9/45558
USPC ....................................................... 455/427
See application file for complete search history.

(56) References Cited

U.S. PATENT DOCUMENTS

| 9,231,691 B2 * | 1/2016 | Atkinson | ........... H04B 7/18515 |
| 10,271,261 B1 * | 4/2019 | Lindsley | ............... H04W 40/14 |

| 11,228,361 B2 * | 1/2022 | McDaniel | .......... H04B 7/18582 |
| 11,804,894 B2 * | 10/2023 | de Carufel | ............. G06N 3/084 |
| 12,017,806 B2 * | 6/2024 | Boccio | ..................... B64G 1/44 |
| 2014/0032034 A1 * | 1/2014 | Raptopoulos | ............ G08G 5/55 |
| | | | 701/25 |
| 2016/0249193 A1 * | 8/2016 | Edge | ....................... H04L 67/04 |
| 2017/0195039 A1 * | 7/2017 | Lauer | ................ H04B 7/18506 |
| 2018/0082084 A1 * | 3/2018 | Takahashi | ............... H04L 9/083 |
| 2018/0316416 A1 * | 11/2018 | Reis | ........................ H01Q 3/02 |
| 2019/0103913 A1 * | 4/2019 | Cooper | ............. H04B 7/18586 |
| 2019/0190591 A1 * | 6/2019 | Wang | .................... H04W 76/15 |
| 2020/0367069 A1 * | 11/2020 | Struhsaker | ......... H04B 7/18593 |
| 2021/0303290 A1 * | 9/2021 | Schmit | ............... G06F 9/45558 |

(Continued)

FOREIGN PATENT DOCUMENTS

| CN | 108881029 A | * 11/2018 | ........... H04L 45/745 |
| CN | 108881029 | 10/2020 | |

(Continued)

OTHER PUBLICATIONS

International Search Report and Written Opinion for International (PCT) Patent Application No. PCT/US2023/070249, dated Nov. 6, 2023 15 pages.

*Primary Examiner* — Mahendra R Patel

(74) *Attorney, Agent, or Firm* — Sheridan Ross P.C.

(57) ABSTRACT

A satellite includes a communication link interface and at least one processor and at least one memory. The at least one processor and the at least one memory are configured to support multiple tenant applications in a multi-tenancy cloud-computing environment, and two or more of the multiple tenant applications establish isolated communication link channels with a ground station utilizing the communication link interface.

21 Claims, 15 Drawing Sheets

(56)  References Cited

U.S. PATENT DOCUMENTS

| 2021/0314060 | A1 * | 10/2021 | Shi ..................... | H04B 7/18504 |
| 2021/0367664 | A1 * | 11/2021 | Akyildiz .............. | H04B 7/1851 |
| 2021/0385865 | A1 * | 12/2021 | Mueck .............. | H04W 74/0875 |
| 2022/0224406 | A1 * | 7/2022 | Xu ........................ | H04W 72/02 |
| 2022/0247486 | A1 * | 8/2022 | Iyer ................... | H04B 7/18541 |
| 2022/0322131 | A1 * | 10/2022 | Shrestha ................ | H04L 69/10 |
| 2023/0072769 | A1 * | 3/2023 | Yeh ................... | H04W 28/0858 |
| 2023/0156826 | A1 * | 5/2023 | Palermo ............ | H04B 7/18517 |
| | | | | 370/329 |

FOREIGN PATENT DOCUMENTS

| CN | | 113067627 | | 5/2022 | | |
| EP | | 4055803 | B1 * | 7/2025 | ........ | B60W 30/0956 |
| WO | WO-2021146029 | A1 * | 7/2021 | .......... | H04W 56/001 |
| WO | WO-2021221736 | A2 * | 11/2021 | ........... | H04W 28/24 |
| WO | WO-2022266564 | A1 * | 12/2022 | ........... | H04W 64/00 |

* cited by examiner

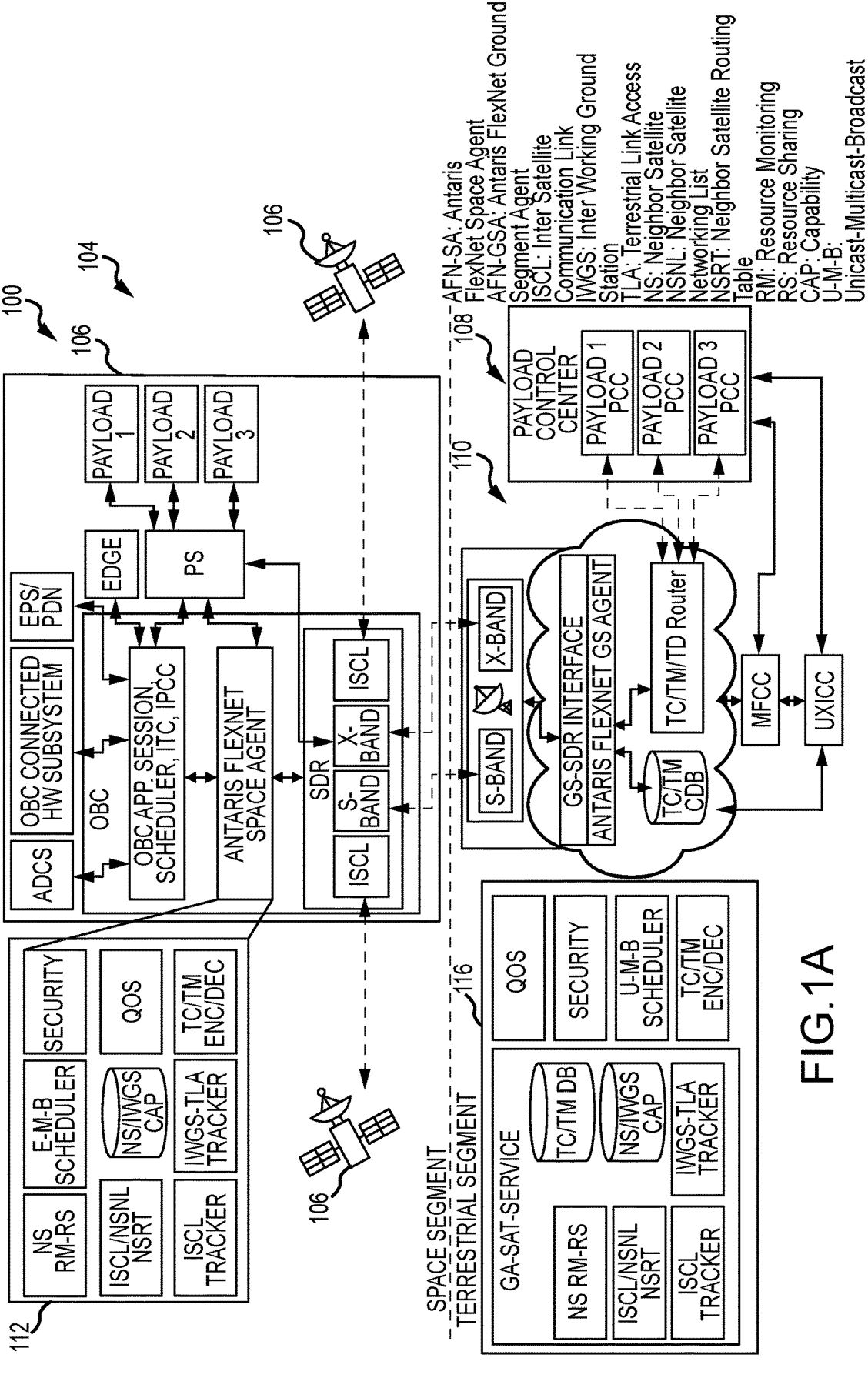

AFN-SA: Antaris FlexNet Space Agent
AFN-GSA: Antaris FlexNet Ground Segment Agent
ISCL: Inter Satellite Communication Link
IWGS: Inter Working Ground Station
TLA: Terrestrial Link Access
NS: Neighbor Satellite
NSNL: Neighbor Satellite Networking List
NSRT: Neighbor Satellite Routing Table
RM: Resource Monitoring
RS: Resource Sharing
CAP: Capability
U-M-B: Unicast-Multicast-Broadcast

FIG. 1A

| 1 BYTE | 1 BYTE | 4 BYTES | 2 BYTES | 1/2 BYTES | 1/2 BYTES | 1/2 BYTES | 1/2 BYTES | 1/2 BYTES | 1 BYTE | 1/2 BYTES | VARIABLE | 1 BYTE | 32 BYTES |
|--------|--------|---------|---------|-----------|-----------|-----------|-----------|-----------|--------|-----------|----------|--------|----------|
| SOF | TC CTRL | TIME STAMP | SEQ NO | SAT ID | GS ID | QOS | SA ID | DA ID | TC ID | TC LEN | TC | CRC | CMAC/ HMAC |

FIG.8

| 1 BYTE | 1 BYTE | 4 BYTES | 2 BYTES | 1/2 BYTES | 1 BYTE | 1/2 BYTES | 1/2 BYTES | 1 BYTE | 1/2 BYTES | VARIABLE | 1 BYTE | 32 BYTES |
|---|---|---|---|---|---|---|---|---|---|---|---|---|
| SOF | TD CTRL | TIME STAMP | SEQ NO | SAT ID | QOS | SA ID | DA ID | TD ID | TD LEN | TD | CRC | CMAC/HMAC |

FIG.10

SPACE COMMUNICATION PROTOCOLS

CROSS REFERENCE TO RELATED APPLICATIONS

This application claims priority to U.S. Provisional Application No. 63/389,318, filed on Jul. 14, 2022, the entire contents of which are hereby incorporated by reference.

FIELD

The disclosure relates generally to distributed processing systems and particularly to communication systems and protocols.

SUMMARY

The present disclosure provides, among other things, a space communication protocol for enabling multi-tenant satellite systems. The protocol may apply to ground station-to-satellite communications and/or to satellite-to-satellite communications. The present disclosure may provide a number of advantages depending on the particular configuration. These and other advantages will be apparent from the disclosure of the disclosure(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" may be used interchangeably herein. It is also to be noted that the terms "comprising", "including", and "having" may be used interchangeably.

The term "application containerization" refers to an operating system-level virtualization method that deploys and runs distributed applications or virtualized applications (e.g., containerized or virtual machine-based applications) without launching an entire virtual machine for each application. Multiple isolated applications or services run on a single host and access the same operating system kernel.

The term "automatic" and variations thereof refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer may read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "cluster" refers to a group of multiple worker nodes that deploy, run and manage containerized or VM-based applications and a master node that controls and monitors the worker nodes. A cluster may have an internal and/or external network address (e.g., DNS name or IP address) to enable communication between containers or services and/or with other internal or external network nodes.

The term "container" refers to a form of operating system virtualization that enables multiple applications to share an operating system by isolating processes and controlling the amount of central processing unit (CPU), memory, and disk those processes may access. While containers like virtual machines share common underlying hardware, containers, unlike virtual machines they share an underlying, virtualized operating system kernel and do not run separate operating system instances.

The terms "determine", "calculate" and "compute," and variations thereof are used interchangeably and include any type of methodology, process, mathematical operation or technique.

The term "deployment" refers to control of the creation, state and running of containerized or VM-based applications. It may specify how many replicas of a pod should run on the cluster. If a pod fails, the deployment will create a new one.

The term "domain" refers to a set of objects that define the extent of all infrastructure under management within a single context. Infrastructure may be physical or virtual, hosted on-premises or in a public cloud. Domains are mutually exclusive, meaning there is no overlap between the infrastructure within any two Domains.

The term "microservice" or "microservice architecture (MSA)" may be used to refer to an architecture style where applications are deployed as small services with messaging and bounded by contexts. The service is autonomously developed, using any suitable programming language, agnostic of software and hardware environments, and independently deployed in a decentralized system. An autonomous satellite and the platform used to build and manage the same may leverage the application of microservices or MSA. The satellite may include three microservices-based distributed modules: Bus/Core, Mission/Payload service, and the Edge. These three microservices-based distributed modules may be connected via internal networking and use messaging/API for communication. The cloud-based development of the satellite maintains a replica of the satellite in orbit, as a digital twin, with components and processes implemented as services in the cloud, with remote communication over technology-agnostic protocols such as HTTP for the user and supplier ecosystem in the development.

The term "module" refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure may be separately claimed.

The term "namespace" refers to a set of signs (names) that are used to identify and refer to objects of various kinds. In Kubernetes, there are three primary namespaces: default, kube-system (used for Kubernetes components), and kube-public (used for public resources). Namespaces are intended for use in environments with many users spread across multiple teams, or projects. At a high level, the extension to namespaces enables multiple virtual clusters (or namespaces) backed by a common set of physical (Kubernetes) cluster.

The term "pods" refers to groups of containers that share the same compute resources and the same network.

The term "tenant" refers to an organizational construct or logical grouping used to represent an explicit set of resources (e.g., physical infrastructure (e.g., central processing units (CPUs), graphics processing units (GPUs), memory, storage, network, and, cloud clusters, people, etc.) within a domain. Tenants "reside" within infrastructure managed by a service provider. By default, individual tenants do not overlap or share anything; that is, each tenant may be data isolated, physically isolated, and runtime isolated from other tenants by defining resource scopes devoted to each tenant. Stated differently, a first tenant may have access to a set of resources, resource capabilities, and/or resource capacities that is different from that of a second tenant. Service providers assign worker nodes to a tenant, and the tenant admin forms the clusters from the worker nodes.

The term "virtual machine" refers to a server abstracted from underlying computer hardware so as to enable a physical server to run multiple virtual machines or a single virtual machine that spans more than one server. Each virtual machine typically runs its own operating system instance to permit isolation of each application in its own virtual machine, reducing the chance that applications running on common underlying physical hardware will impact each other.

The term "communication link" refers to a radio frequency communication link, an optical communication link, and/or any medium of communication between one or more satellites, and also refers to a satellite to satellite communication and/or any medium of communication link between a satellite and a ground station. The communication between satellites may herein be referred as side link and/or "inter satellite communication link" and/or ISCL. The communication from a ground station to a satellite may herein referred as an uplink communication. The communication from a satellite to a ground station may herein referred as a downlink communication. The term "communication link" can also refer to more than one "communication link" between satellites and/or there may be more than one "communication link" between satellite and ground station.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE FIGURES

The accompanying drawings are incorporated into and form a part of the specification to illustrate several examples of the present disclosure. These drawings, together with the description, explain the principles of the disclosure. The drawings simply illustrate preferred and alternative examples of how the disclosure may be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

Additional details of the disclosure are in the following attachments, each of which is incorporated herein by this reference:

FIG. 1A illustrates a system for space communication according to at least one example embodiment.

FIG. 8 illustrates a frame format for a telecommand according to at least one example embodiment.

FIG. 10 illustrates a frame format for teledata communication according to at least one example embodiment.

DETAILED DESCRIPTION

Figure 1B:
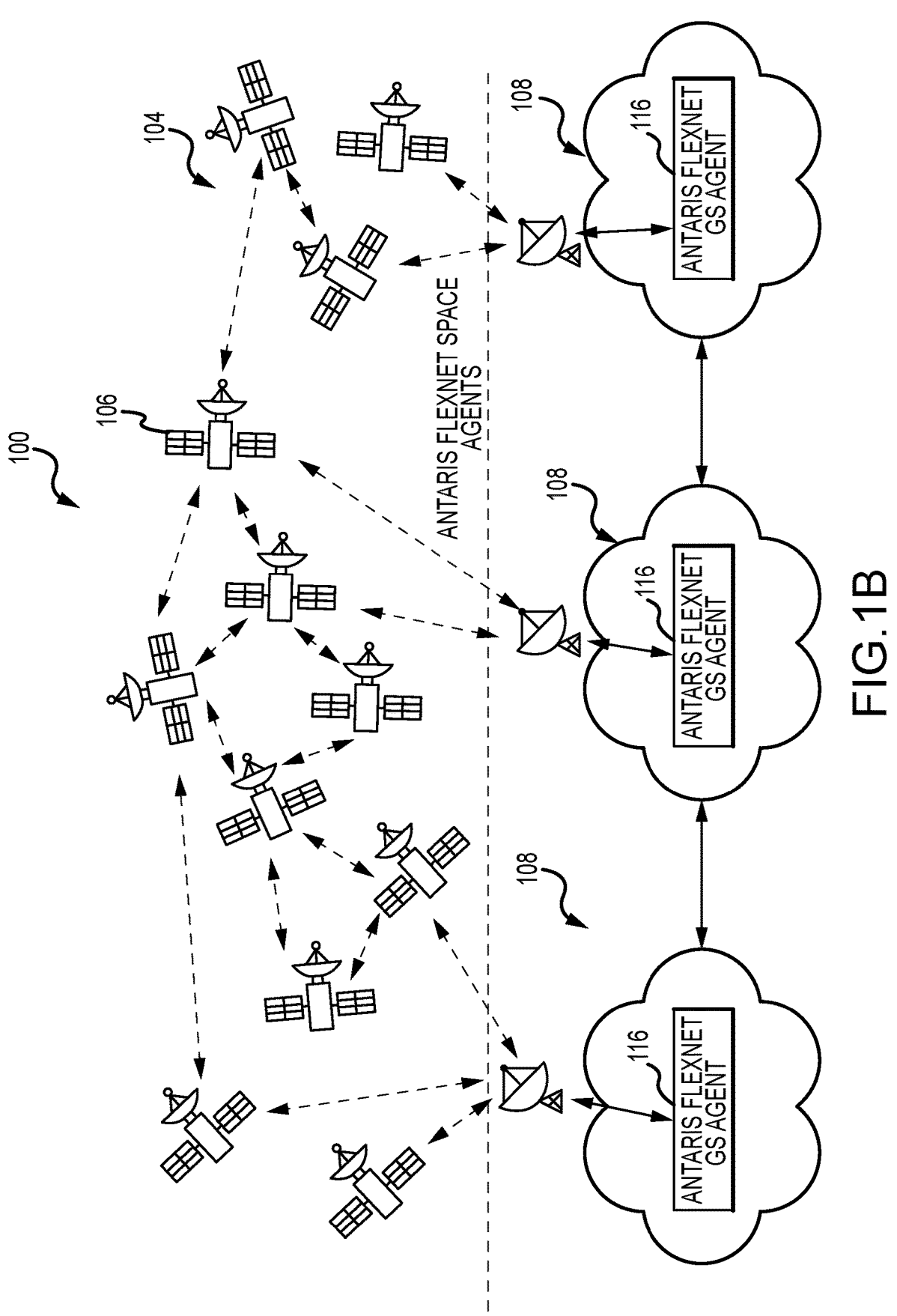
FIG. 1B illustrates an example constellation including multiple systems from FIG. 1A according to at least one example embodiment.

The present disclosure is directed to a satellite or systems, which may include a satellite and a ground station. In any event, satellites and ground stations according to embodiments of the present disclosure enable multiple different and separate users to access the same resources (e.g., payloads) of a satellite to carry out different missions in a fast, reliable, and secure manner.

Additional details of the disclosure are in the following attachments, each of which is incorporated herein by this reference:

The illustrative systems and methods are described in relation to satellites deploying resources in a particular manner. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the embodiments illustrated herein show the various components of the system collocated, certain components of the system may be located remotely, at distant portions of a distributed network, such as a LAN and/or the Internet, or within a dedicated system. Thus, it should be appreciated, that the components of the system may be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence may occur without materially affecting the operation of the disclosure.

A number of variations and modifications of the disclosure may be used. It would be possible to provide for some features of the disclosure without providing others.

In yet another embodiment, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

In yet another embodiment, the disclosed methods may be readily implemented in conjunction with software using object or object-oriented software development environments that provide portable source code that may be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that may be stored on a storage medium, executed on programmed general-purpose computer with the cooperation of a controller and memory, a special purpose computer, a microprocessor, or the like. In these instances, the systems and methods of this disclosure may be implemented as program embedded on personal computer such as an applet, JAVA® or CGI script, as a resource residing on a server or computer workstation, as a routine embedded in a dedicated measurement system, system component, or the like. The system may also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

In general, example embodiments relate to the specification for Telecommand (TC), Telemetry (TM), and Teledata (TD) flow between a ground station (GS) and satellites as well as between different satellites and between different ground stations. Example embodiments cover a wide range of uses cases currently in practice and the use cases envisioned for next-generation space technologies. The TC/TM/TD formats and the call flows described herein are designed in such a way that they are mission agnostic, radio technology agnostic and may be adapted for LEO, MEO, GEO, EO (Earth observation) and COM (Communication) and, in general, for any category of satellites and or space vehicles. The command formats and command scheduling covers commands from a ground station to a satellite and also between satellites via Inter Satellite Communication Link (ISCL).

The following, non-limiting, example use cases are envisioned while designing the protocol and frame format of TC/TM messages. Please note the example use cases specified in this section may not cover all the uses cases defined in other sections of this document. 1. One entity launching one satellite, running one mission/application sending multiple commands. 2. One entity launching one satellite, running multiple mission/application sending multiple mission specific commands. 3. One entity launching multiple satellites and running various applications/mission on each satellite, sending multiple commands to applications/mission running in multiple satellites individually. 4. One entity owning multiple satellites (satellite 1, 2, 3, 4 and 5) sending a single telecommand to all of its owned satellites. This may be referred to as Telecommand broadcasting and this broadcasting is not at the radio link level, and is instead at the Telecommand center Application layer. At the radio link level, the command(s) still addresses one satellite at a time.

Figure 3:
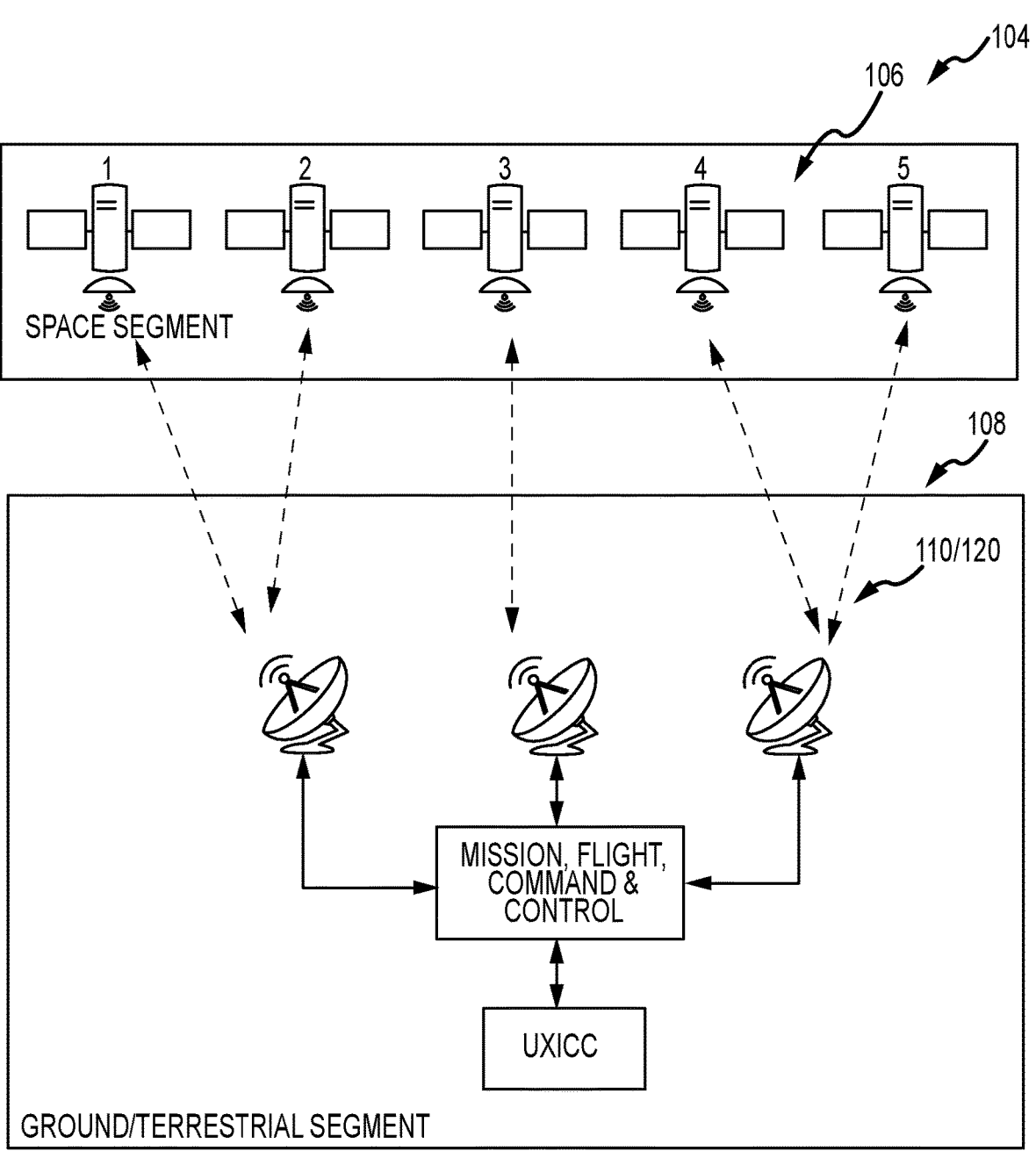
FIG. 3 illustrates an example for broadcast transmission according to at least one example embodiment.

5. One entity owning multiple satellites (1, 2, 3, 4 and 5), sending a single Telecommand to some of its owned satellites (1, 2 and 3). This may be referred to as Telecommand multicasting and this multicasting is not at the radio link level but instead at the Telecommand center Application layer. At the radio link level, the command still addresses one satellite at a time. 6. Single satellite carrying multiple payload/mission and the payload/missions are shared by different/multiple users. The multiple users or entities send multiple commands to their respective payload/mission applications running in a single satellite. In this use case, mission/payload users are given access to schedule their own commands in their private and secured manner for their payload/missions. 7. Multiple satellites carrying multiple payloads/missions and the payloads/missions are shared by different/multiple users/entities. The multiple users or entities sending multiple commands to their respective payload/mission applications running in a pool of satellites. In this use case, mission/payload users are given access to schedule their own commands in a private and secured manner in either broadcast mode or multicast mode to their respective payload/missions. 8. Telecommand that may be sent from Satellite to satellite via any Inter Satellite Communication Link (ISCL) communication in the space without involving GS/Terrestrial entity in-between as shown in FIG. 3. An Inter Satellite "Communication link" may form a network of neighboring satellites for sending and receiving TC, TM, and/or TD messages.

Example embodiments of the present disclosure provide at least the following features and advantages:

1. Support for end to end application layer communication interface between the user experience UX user interface UI (UX/UI) and Mission Flight Command & Control (MFCC) and between Payload Command Control (PCC) and GSs, between a GS and satellite, and between satellites (intersatellite communication).
2. Simplified and light weight data structure detention.
3. Support for multi-tenant applications.
4. End to end security at the application layer.
5. QoS at the tele command and telemetry, unicast, multicast and broadcast application layer.
6. Intersatellite side link messaging to enable neighbor-aware intersatellite networking in space;
7. Satellite and ground stations internetworking and roaming via inter-MFCC interfaces exchanging TC/TM to coordinate the satellites across the ground station networks and ISCLs.
8. Emergency transmissions using ISCL/side link signaling.
9. Limited/emergency access to GS pass times and bandwidth allocation for emergency communication (similar to mobile phones that have emergency call access via any network).
10. Multicast and broadcast features between GSs and satellites and also between satellites.
11. Enabling near edge retransmission (RTX) of a TC (e.g., a GS Antenna notifies the MFCC about the failure in transmission of the TC and the MFCC retransmits the TC, and receives an ack-based RTX at the application layer).
12. Standardizing TC and TM messages and data structures for OBC, ADCS, Comm's (Radio), EPS, and other sensors, payload, sub-systems and satellite applications.
13. TC/TM support for multi-tenant applications running in one satellite—this architecture enables end to end, isolated and secured TC/TM exchange for each tenant.

The TC/TM may be partitioned into Flight Command Control and Payload Command Control—Payload Command Control may be under the payload/tenant administration with their own security enabled and/or each payload owner may be given their secured TC/TM channel access to exchange their TC/TM with dedicated UI/UX plugins (here, some restriction and access level permissions may be defined for an allowed TC/TM/TD, such as payload internal processing related to the TC/TM/TD).

14. Multi-tenant applications running across satellites/space vehicles (SV) with resources shared across SVs (e.g., a mission running in SV1 offloading the task to other SVs—for example, SV1 wants to share the computing resource with SV2—in another example, SV1 could not successfully perform a critical mission at time T and in Orbit Point Location (OPL)1 (there could be various reasons [environmental, power, etc.] that SV1 could fail), and sends a command/request to the neighbor SV2 that asks for the mission task to be carried forward by SV2.

15. When the multi-tenant and resource sharing becomes a requirement, then automatically QoS and security becomes a requirement, which is addressed with example embodiments. QoS is based on the radio link or optical link or other means of "communication link" bandwidth availability, and the "communication link" bandwidth may be limited and time shared across multiple missions/payloads and so QoS at the TC/TM layer becomes useful—this feature takes advantage of the "satellite internetwork roaming" to load share and time share the GS and ISCL communication end point resources if allowed/applicable by the other GS and Satellites in the space network.

16. Neighbor aware intersatellite networking in space—for certain applications, where the entire ground/earth may need 100% coverage 24/7, forming a mesh network across the satellites or space vehicles in space becomes useful. A TC/TM application layer interface is used to make the satellite network neighbor aware. The architecture accomplishes this by enabling the neighbor satellites to exchange secure communications, and also obtains information in coordination with GS database. In addition, the GS Client Satellite (GSCS) TCs may carry the capabilities of each satellite and the capabilities may include i. relative orbit time/distance of the GSCS with respect to the current satellite in communication, ii. GSCS allowed and available downlink/uplink (DL/UL) data bandwidth, iii. GSCS ISCL capabilities (number of ISCL antennas, "communication link" parameters, allowed and available ISCL data bandwidth), and iv. optionally may carry the mission parameters and the GSCS neighbor satellite processing/computing (sharable) capabilities. Neighbor satellite details that may be exchanged between the satellites and stored in the database include i. Neighbor satellite ID, ii. Current Location and orbital parameter (the Satellites may calculate the relative positioning and ISCL contact points and pass time based on this information), iii. ISCL communication parameters, iv. "communication link" quality, available and allowed UL/DL data bandwidth via ISCL, v. available and allowed data bandwidth from the neighbor satellite to GS "communication link" (both DL and UL), vi. neighbor satellite mission capabilities, vii. neighbor satellite processing/computing (sharable) capabilities, and viii. any other such information that may support or facilitate each other satellite mission may be exchanged between the satellites and that may be stored. In addition, the architecture may perform neighbor satellite network routing table maintenance.

17. Satellite internetwork roaming for Inter/Intra MFCC interface TC/TM exchange. The same operator may run multiple MFCCs (for different set of satellite/mission operations), and may use a coordinated way of exchanging TC/TM across satellites. This interfacing may become a requirement based on the way the space network is evolving. In one example, an SV in network 1 identifies an anomaly and communicates the anomaly to the MFCC of GS of operator 1. That MFCC then communicates the anomaly to all the other operators for the sake of taking emergency actions. There may be GS "communication link" resource sharing across the satellite network. In some examples, the same TC (e.g., an emergency or critical TC) is scheduled over multiple GSs for redundancy and for guaranteed and timely transmission of the TC to satellites in the network. In some cases, the TC triggers GS scanning and neighbor satellite scanning to identify new neighbors and/or new GSs (not pre-configured) for emergency or mission critical TC/TM exchange. The TC/TM interface command/messages may interact across MFCCs running at two different satellite operators.

Figure 5:
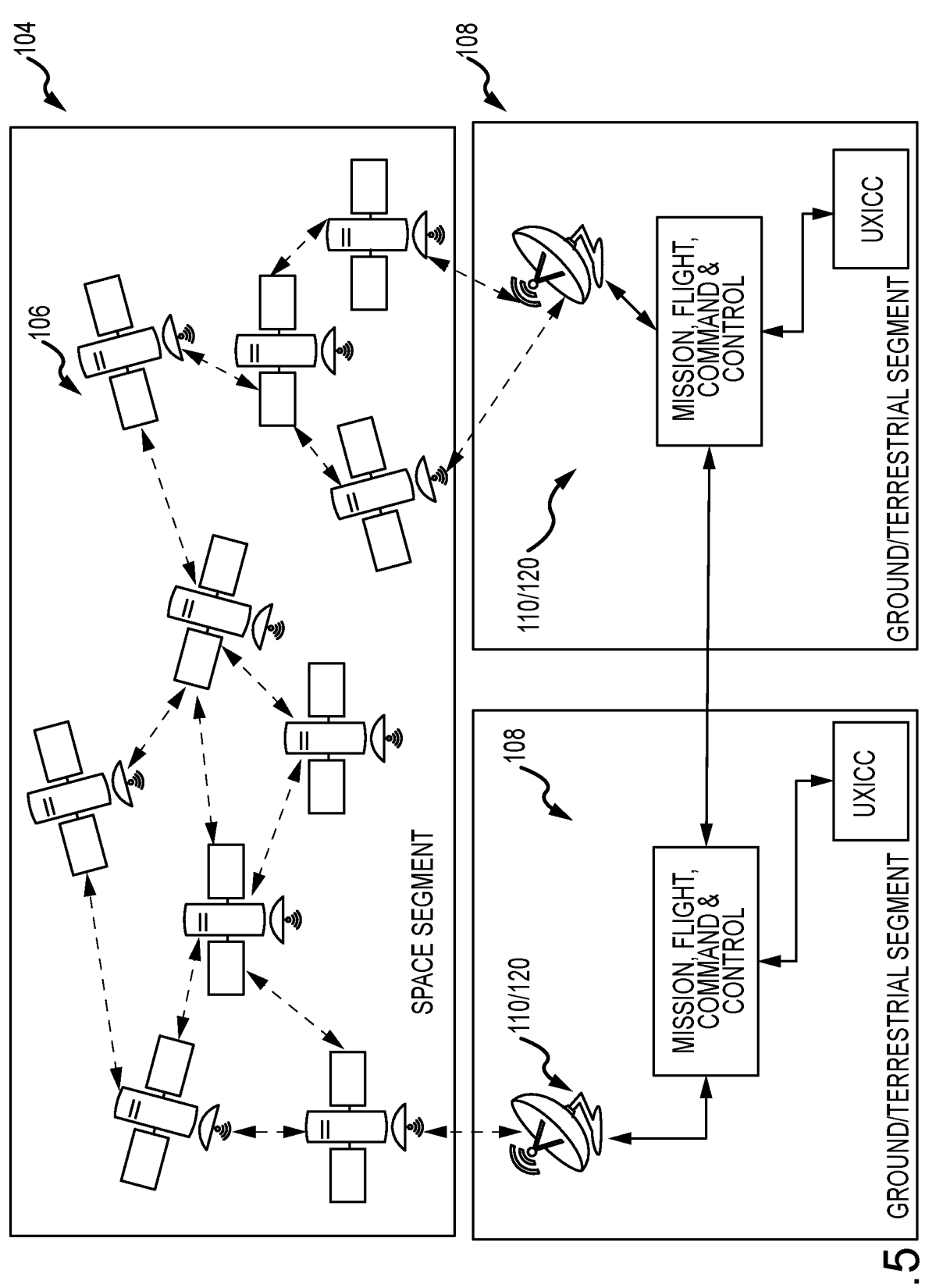
FIG. 5 illustrates communication between satellites according to at least one example embodiment.
Figure 6:
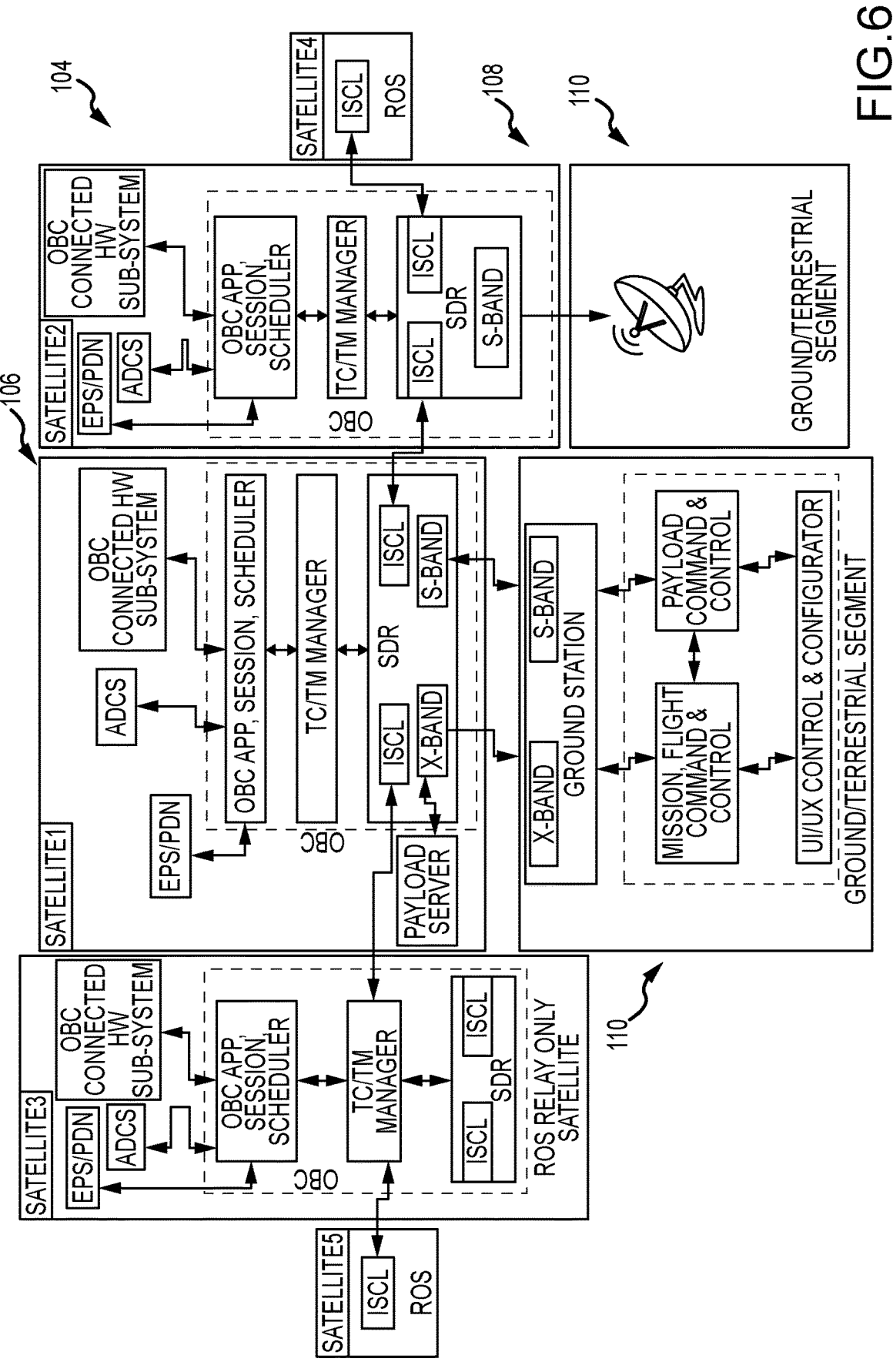
FIG. 6 illustrates an example system with relay only satellites according to at least one example embodiment.

FIG. 1A illustrates a system 100 for enabling communication between a space segment including a satellite system 104 including one or more satellites 106 and a terrestrial or ground segment including a ground system 108. A satellite 106 may have any suitable configuration, such as a 1 U satellite, at 3 U satellite, a 6 U satellite, etc. As shown, a satellite 106 may include various components normally associated with satellites, such as payloads 1, 2, 3, a payload server PS, an edge server Edge, an onboard computer (OBC) in communication with an electrical power system (EPS) and power delivery network (PDN), an OBC connected hardware (HW) subsystem, and an attitude determination and control system (ADCS). The OBC may include its own applications, session management, and scheduler. The OBC may further include or be in communication with one or more communication interfaces, such as software defined radios (SDR) for S-band and/or X-band "communication link" over one or more antennas, and interfaces that enable intersatellite communication links (ISCLs) with other satellites 106. The S-band interfaces may be used for exchanging TCs and TM data between a satellite 106 and a ground station 110 while the X-band interfaces may be used for sending mission and payload data from the satellite 106 to a ground station 110. An ISCL may be any radio link with any operating RF bands or optical link or other means of "communication links" used for communication between the satellites 106. One such example for ISCL is Optical Inter Satellite Link (OISL). As shown in FIG. 6, some satellites 106 may be built with ISCL for intersatellite communication and with S-band and/or X-band for ground station communication. Meanwhile, some satellites 106 may be built with only ISCL for primary use in an intersatellite communication network to relay or route TC, TM, and/or TD messages between the satellites 106. These types of satellites may be referred to as Relay Only Satellite (ROS). In some cases, a satellite 106 includes more than one ISCL for communication with multiple satellites 106 at the same time. FIGS. 5 and 6 show examples where satellites 106 communicate with one another via ISCLs.

Notably, the OBC further includes a specially programmed agent 112 that enables various advantageous functionalities described herein, including but not limited to enabling multitenant usage of resources of a satellite 106. As shown, the agent 112 includes or enables various modules including but not limited to a module for neighbor satellite resource monitoring and resource sharing, a unicast-multi- cast-broadcast scheduler, a security module for encrypting and decrypting messages, a module that enables ISCLs using networking lists and routing tables, a database for storing lists of neighbor satellites and potential ground stations, a module for managing QoS, an ISCL tracker, a ground station and terrestrial link access tracker, and a module for encrypting and decrypting TCs and TMs. The OBC may include suitable hardware and/or software for carrying out processing tasks. For example, the OBC may include one or more processors executing instructions (data) stored on a memory. Additionally or alternatively, the OBC may include an application specific integrated circuit (ASIC), a field programmable gate array (FPGA), or other suitable collection of circuits that enable computer process- ing functions.

Meanwhile, the ground system 108 includes a ground station 110, which may include a payload control center (PCC) (also called payload command and control and pay- load command and controller herein) with modules for controlling respective payloads of a satellite 106. The PCC may be in communication with a TC/TM/TD router and manager for managing routing commands and other mes- sages on behalf of the ground station 110.

The ground station 110 may further include an SDR interface with one or more antennas to enable S-band and/or X-band and/or UHF "communication link" with the corre- sponding S-band and/or X-band and/or UHF interfaces and antennas of a satellite 106. The ground station 110 may include a database for storing TC/TM COB (Center of Box) information. Like the satellite 106, the ground station 110 includes a specialized agent 116 that enables various advan- tageous functionalities described herein, including but not limited to multitenant usage of satellite resources. As shown, the agent 116 may include some of the same or similar modules as the agent 112 (not repeated again for the sake of brevity). The agent 116 additionally includes a database DB for storing TCs and TMs and associated information.

The ground station 110 may further include or be in communication with a Mission Flight Command and Con- trol (MFCC) module. A user of the ground system 108 may interact with (provide inputs to and view or receive outputs from) elements of the ground station 110 through a user experience/user interface (UX/UI) Control and Configurator (UXICC), which may correspond to one or more input devices (keyboard, mouse, touch display, microphone etc.) and one or more output devices (a display, speakers, etc.). That is, the UXICC module includes graphical user interface (GUI) controls and interfaces typically found in or used for web browsers, mobile phones, tablet devices, and/or servers. In some examples, the UXICC receives inputs from the user/administrator and translates the inputs into a JSON file or other suitable file format and sends the translated inputs to the MFCC and/or the PCC. Notably, a user may configure and schedule a TC via the UXICC. The user may schedule a TC for a single satellite (unicast), for a group of satellites (multicast), or for all satellites (broadcast). On the receiving end, the UXICC receives telemetry data and displays the telemetry data in a dashboard of the user's choice.

Figure 2:
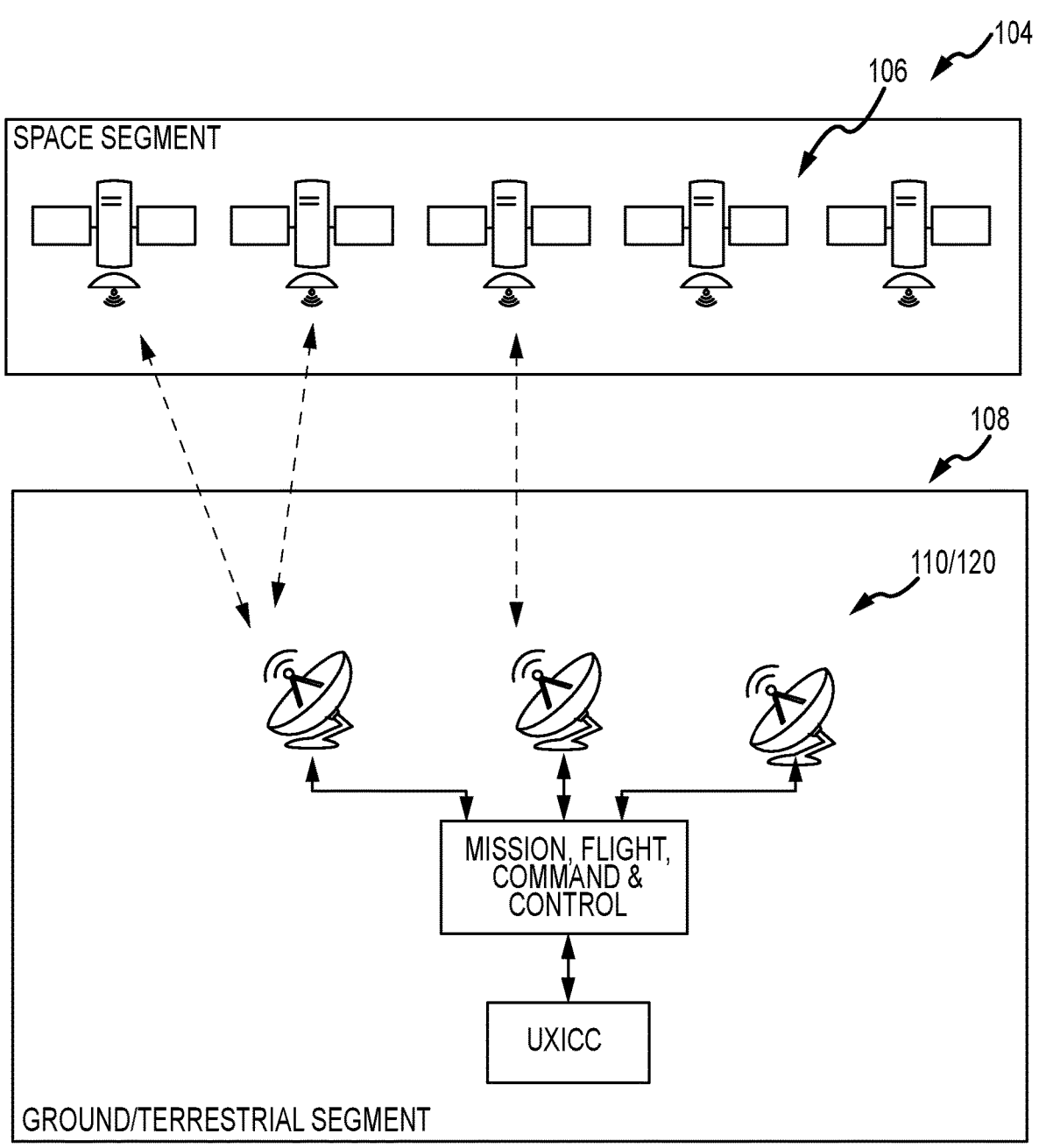
FIG. 2 illustrates an example for multicast transmission according to at least one example embodiment.
Figure 4:
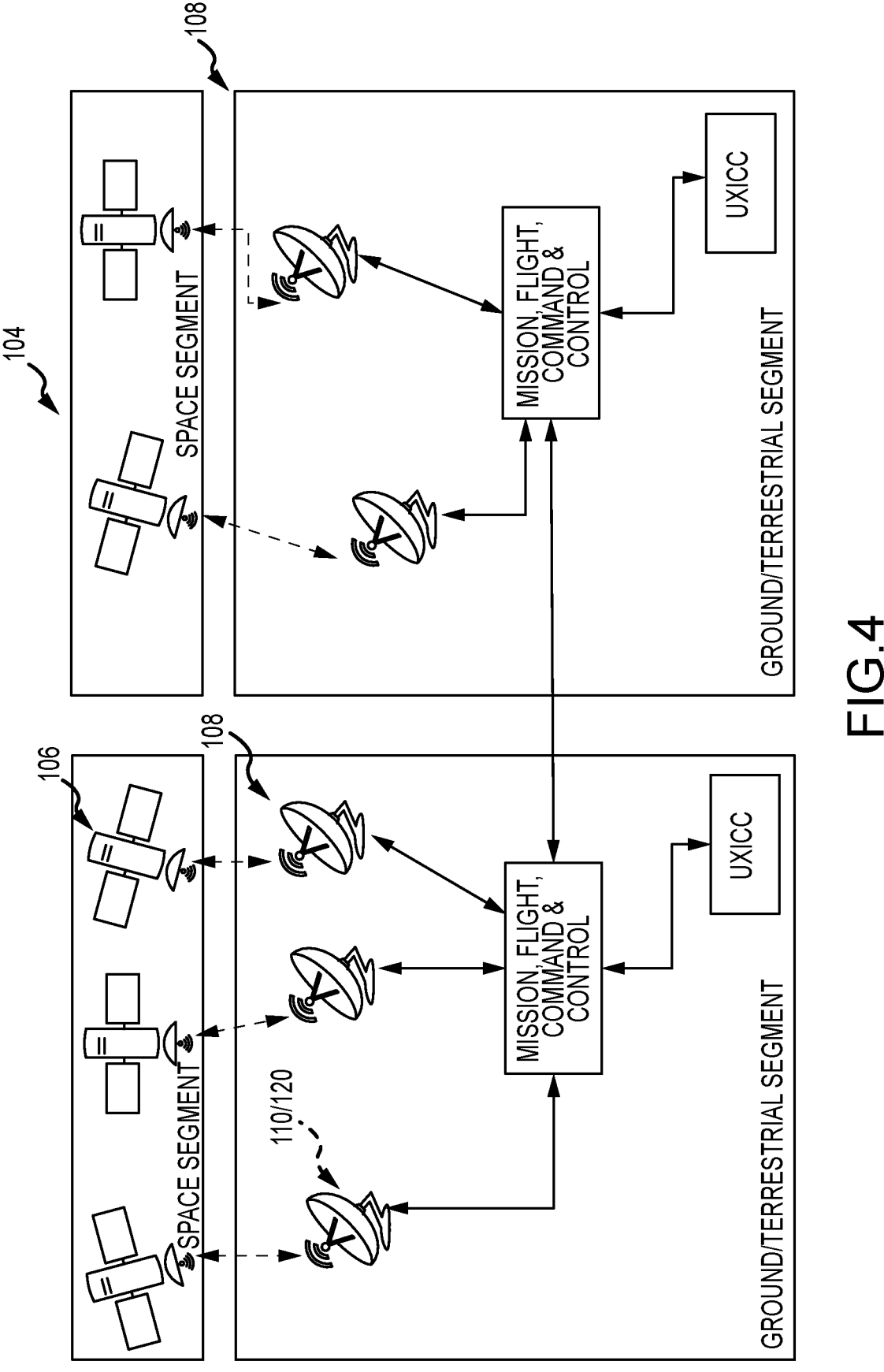
FIG. 4 illustrates communication between mission, flight command and control modules and communication between a single mission, flight command and control module and multiple ground stations/antennas according to at least one example embodiment.

As may be appreciated, the ground system 108, including the UXICC, the PCC, and/or the MFCC, runs in one or more computing nodes. The computing node(s) may be imple- mented with a standalone computer or with cloud based computing resources. As shown in FIGS. 2, 3, and 4, a single MFCC may be in communication with multiple remotely located ground stations 110 represented by antennas 120. The MFCC itself may be included with one of the ground stations 110 or remote to all ground stations 110.

Although FIG. 1A illustrates a single ground system 108, additional ground systems 108 may be included in the system 100—with each ground system 108 including the same or similar components as illustrated in FIG. 1A and being capable of communicating with other remote ground systems 108 (e.g., over the Internet or other suitable network connection). In the case of multiple ground systems 108 as shown in the constellation of FIG. 1B, one or more ground systems 108 may have only some of the functionality discussed with reference to FIG. 1A. For example, a ground station 110 with reduced functionality may not include the S-band and/or X-band interfaces, and instead rely on the interfaces of another ground station 110.

Various elements in FIGS. 1A and 1B and other figures are described in more detail below, beginning with the MFCC.

In general, an MFCC is responsible for encoding, man- aging, timing, and scheduling telecommands to satellites 106. In some examples, the UXICC may send a request to an associated MFCC module to send/schedule a TC to a single satellite 106 (unicast) or for group of registered satellites 106 (multicast as shown in FIG. 2) or for all the registered satellites 106 (broadcast as shown in FIG. 3). Functionalities of an MFCC for TC scheduling include but are not limited to receiving a request to send a TC to a satellite 106 from a UXICC and/or from a PCC, and identifying the nearest pass time of the satellite 106 for the next/nearest ground station 110 that the satellite 106 may come into contact with. Here, the MFCC may have prior configured knowledge about the ground station 110 and satellite 106 end points. This knowledge may be dynami- cally changed—for example, if there is a new contract established to have the satellite 106 communicate with a new ground station 110, details of the ground station 110 details may be communicated to the satellite 106 through a TC. Additional functionalities of an MFCC include manag- ing QoS and prioritizing the TC based on one or more factors, such as an available uplink bandwidth at the "com- munication link" between the ground station 110 and satel- lite 106 based on the next/nearest pass of the satellite 106, and TCs waiting in a TC queue to be scheduled to the satellite 106 and each TCs priority and mission criticality defined in a TC QoS configuration. Such priority may be compared against TCs in the queue for the one tenant mission and/or priority may be compared against TCs in a queue across a multiple tenant mission. Another factor that influences priority includes starvation time of a TC which may correspond to an amount time elapsed since the TC entered the queue.

Other functions of an MFCC include encoding TCs as per the protocols and formats defined herein, securing a TC if requested, scheduling a TC to a satellite 106 by selecting one or more antennas of a ground station 110, and managing broadcast and multicast scheduling. In case of a broadcast or multicast TC request, a single TC request from a UXICC or PCC to MFCC may be mapped to multiple satellites 106. In some examples, the MFCC prepares the list of satellites 106 that are intended to receive the TC, and, based on the current state and location of the satellites 106 and their preconfig- ured ground station "communication link" permits, the MFCC identifies one or more ground stations 110 and satellite pass time combinations to specify the next/nearest ground station, satellite "communication link" pass time, and "communication link" (e.g., a communication link in the form of an radio frequency antenna, an optical link, etc.) for transmitting the TC. Thereafter, the MFCC sends the TC with satellite identification information to the identified antenna, and the antenna transmits the TC to the specified satellite(s) at the respective pass time(s). It should be understood, then, that an MFCC may be in communication with one or more antennas 120 as shown in FIGS. 2 and 3.

In cases with multiple MFCCs, each MFCC may reside in a different computing node, which may be cloud based, a dedicated server, or other computing device, and the MFCCs may communicate with each other as shown in FIG. 4 to coordinate with one another to find the next/nearest ground station 110 and satellite pass time, which helps achieve optimal scheduling of transmissions.

In some examples, one or more MFCCs may schedule the same TC for transmission over multiple ground stations 110 for redundancy and for guaranteed, timely transmission of TCs. In addition, an MFCC may schedule a TC for a relay only satellite using the satellite 106 the MFCC is in communication with. The scheduled TC could be unicast, broadcast, or multicast.

An MFCC may further manage TC ACKs and NAKs on behalf of a ground station to verify the success or failure of transmission of a TC to a satellite 106. For example, an antenna 120 may fail to communicate a TC or other signal to a satellite 106, in which case the antenna 120 sends a NAK to the MFCC. Thereafter, the MFCC may attempt to re-schedule the TC (e.g., in the event of a "communication link" level failure at the antenna 120). In some examples, the attempt to re-schedule the TC may be based on QoS criteria associated with the TC, and the QoS criteria may be adjusted compared to the original (failed) transmission. The number of attempts to re-schedule a particular transmission may be configurable at the MFCC with or without user direction. At the time of re-schedule, the MFCC may re-identify the next/nearest ground station and satellite pass time and then initiate the TC transmission request to the antenna 120. As a result, the first (failed) transmission the subsequent re-schedule of the transmission need not be through the same antenna 120 or even the same ground station 110.

Meanwhile, the MFCC manages TC ACKs (if enabled) that are received from a satellite 106 in the event of a successful transmission. In some cases, the MFCC manages timeout events and retransmission of a critical TC (if required or requested by TC QoS). Here, an MFCC times out and considers a transmission as a failure at the application layer level and attempts to re-schedule the transmission when there is no response/ACK received from the satellite 106 for the transmission but the antenna 120 has indicated successful transmission. The amount of elapsed time before determining that a timeout has occurred is configurable with or without user input. For example, the amount of time may be determined based on satellite and ground station pass time scheduling. In addition, the number of attempts to re-schedule a transmission in response to detecting a timeout may be configurable with or without user input. As may be appreciated, the MFCC may notify a user through the UIXCC about the successful or unsuccessful scheduling/transmission of a TC or other type of transmission.

Additional functionalities of an MFCC include identifying non-responsiveness from a satellite 106 and initiating recovery handling. An MFCC may also handle TC errors.

An MFCC may manage received telemetry (TM) data from a satellite 106. In general, TM data includes measurements and readings used to determine the health and status of a satellite 106. Some example functionalities of the MFCC for handling TM data include but are not limited to authenticating and deciphering (if required) and/or decoding TM data. An MFCC may also identify the registered modules/services to which the TM data is forwarded. Here, more than one module/service may register for TM data from a satellite 106. For example, a satellite diagnostic/health monitor service and a remote debugging service may both receive the same TM data from a satellite. As may be appreciated, an MFCC may forward TM data to the UXICC for dashboard display and forward any PCC-related TM data to the PCC module. In multi-tenant scenarios with multiple users having access to the same satellite, each tenant administrator or user may subscribe to mission/service-specific TM data, in which case the MFCC forward the relevant TM data to the corresponding registered tenant admin/user/service. An MFCC may also handle duplicate detection and filtering as well as beacon monitoring, timeouts, and error handling.

A PCC is responsible for handling (processing, forwarding, and routing) all incoming data (e.g., Teledata TD) from payloads of a satellite 106. The PCC may manage various payload activities of the payloads residing in the satellite 106. The PCC may manage mission specific and payload specific TCs and TM data. In some examples, a PCC receives a TC request from a UXICC, and the PCC may request and initiate the Telecommand through the MFCC. Since the satellites 106 are multi-tenant capable, the PCC may encode a mission specific TC and also may secure (authenticate and cipher/de-cipher) the TC by using private and/or public security keys generated by or provided to the PCC. In some examples, the PCC interprets inputs provided at the UXICC, generates a message, and then relies on an MFCC for encoding the message and enabling the secure communication of the message. On the receiving side, the PCC receives PCC-related telemetry data from an MFCC.

Figure 7:
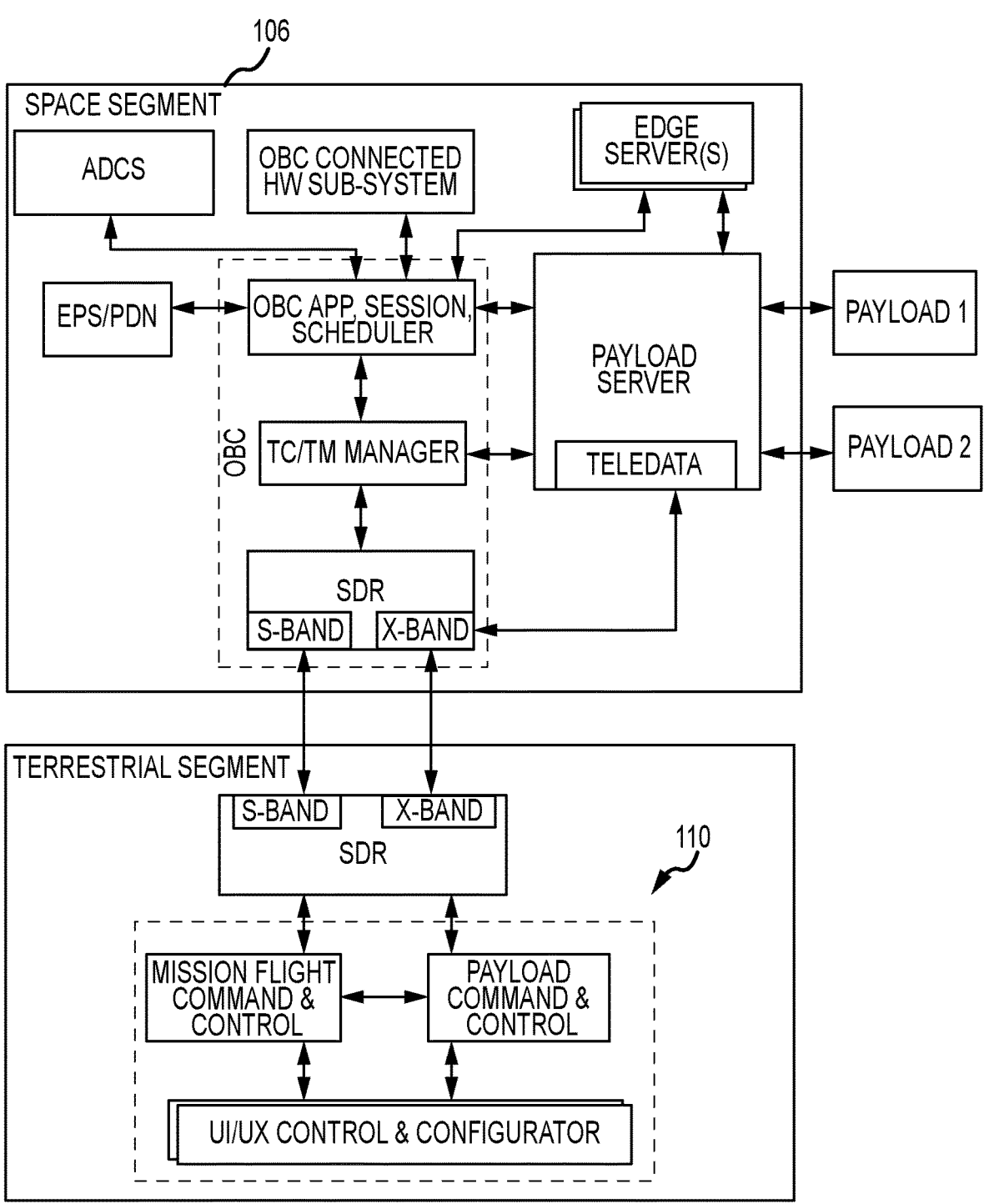
FIG. 7 illustrates another example system for space communication according to at least one example embodiment.

FIG. 7 illustrates various elements from FIG. 1A and further emphasizes how an OBC may include a telecommand and telemetry (TC/TM) manager. In some examples, the TC/TM manager is at least part of or included in the agent 112. As shown in FIG. 7, the TC/TM manager is in communication with the SDR of a satellite 106. The TC/TM manager is responsible for processing commands received from various ground segment entities and onboard payload entities. The TC/TM manager may further process TCs and TM data TM received via one or more ISCLs. As shown, the TC/TM manager is connected with the payload server and OBC applications for managing various operations and functionalities. The TC/TM manager may forward incoming commands from ground segment entities and from ISCLs to the payload server and the edge server(s) or other hardware or software of the satellite 106. The TC/TM manager may manage TCs received from a ground station 110 and/or from ISCLs and scheduling TM data on behalf of the satellite. Although not explicitly shown, a ground station 110 may include its own TC/TM manager as at least part of agent 116.

Functionalities of the TC/TM manager include but are not limited to receiving, a TC from a ground station 110 and/or from another satellite 106 over an ISCL, authenticating and deciphering the TC (if required) and decoding the TC (if required), identifying the registered modules/services to which the TC shall be forwarded or routed (more than one module/service may register for a TC, such as the ADCS, payload server, edge server, another satellite, etc.), and forwarding the TC to the identified modules/services. The TC/TM manager may perform TC duplicate detection and other error handling functions, and identify and manage the next pass time for the next ground station that a satellite 106 will come in contact with. As with the MFCC and PCC, TC/TM manager has prior configuration information about the ground stations and satellites 106 to assist with identifying and managing the next pass time (when the satellite reachable by the ground station), and such information may be dynamically changed through a TC—for example, if there is a new contract established to have a satellite 106 to come in "communication link" with a new ground station 110, details of the ground station 110 may be send to the satellite 106 using a TC.

In some examples, the TC/TM manager identifies and manages ISCL availability and schedules/relays/routes a TC, TM data, or TD meant for other satellites via an ISCL. For example, the TC/TM manager may encode the TC, TM, and/or TD messages to be sent over the ISCL to the other satellites 106. Notably, each tenant or user accessing the satellite 106 may specify certain parameters for sending TC, TM, and TD messages, such as the type of encoding used. If the encoding satellite 106 has more than one ISCL, then the TC/TM manager may select from the existing ISCLs based on the QoS and transmission requirements of a TC, TM, and/or TD message (the requirements for broadcast transmissions, multicast transmissions, and QoS parameters are carried in the TC/TM/TD header fields—additionally or alternatively, one or more of the transmission requirements and QoS parameters may be pre-configured before launch and/or sent as a separate TC while the satellite is in orbit). If any mission/time critical message needs to be relayed or routed, the TC/TM manager may transmit the message multiple times (e.g., back to back) for assured success of the transmission. In some examples, the TC/TM manager monitors the ISCL transmission failure and handles retransmission of the message over the same or different ISCL. Here, the number of retransmissions may be based on the QoS requirements. If any acknowledgement or similar response is expected from the receiving side of the ISCL satellite, the TC/TM maintains a timer for receiving the acknowledgement and handles timeout determinations and retransmission of the message over an ISCL. Notably, the amount of time before detecting a transmission timeout and the number of retransmissions may be set with or without user input. The TC/TM manager may handle the ACK or response (data) at the relayed satellite (e.g., satellite 1 sends an ISCL TC to satellite 2 and satellite 2 relays/routes the TC to satellite 3—upon successful transmission of the TC to satellite 3, satellite 2 may send the response or ACK to the satellite 1 confirming the successful transmission of the TC to satellite 3). The TC/TM manager may maintain one or more databases to store the ground station and satellite network details as descried herein.

In some cases, the TC/TM manager manages QoS and prioritizes TM data and/or TD based on the available bandwidth and the TM data and/or TD waiting in queue to be scheduled to a ground station 110 or another satellite 106. The TC/TM manager may encode the TM data and/or TD as per the protocol defined discussed herein, and secure the message if required. The TC/TM manager may schedule the TM data and/or the TD to the ground station 110 and/or to the other satellites 106 via ISCL. The TC/TM manager may further schedule an ACK for a received TC (if enabled). The TC/TM manager may further manage time outs and retransmission of critical TM data (if required or requested), and detect and filter out duplicate received TC/TM/TD packets, schedule beacon to a ground station 110 for keep alive. The TC/TM manager may further identify non-responsiveness or no "communication link" for extended period of time from any ground station 110 and ISCL and initiate recovery handling, and handle TM data errors.

Example embodiments related to database contents and management at a satellite 106 and a ground station 110 are discussed in more detail below. One set of database information at the satellite 106 includes ground station geolocation information and satellite pass time information based on the satellite's current orbit. The database may have entries for all ground stations 110 that the satellite 106 may pass or come in contact during orbit. The database may include information indicating which ones of the ground stations 110 are authorized to communicate with the satellite 106 and which ones of the ground stations 110 are restricted from communication. Such restricted ground stations may be prevented from communicating with the satellite 106 except for in critical or emergency situations. The criteria for critical or emergency communications is stored in the database and may be pre-configured or updated in real-time through TCs. In general, information in the database is pre-configured before launch and/or is updated through TCs when the satellite 106 is in orbit.

While in orbit, the satellite 106 may be perform full orbit scanning to detect new and existing ground station "communication links". The periodicity of the scan may vary and be selectable with or without user input (e.g., scan once every 30 days). Additionally or alternatively, a scan may be triggered as part of sending a TC and/or triggered when there is time critical or emergency data to be transferred to a ground station 110.

A satellite 106 may further store information about available and allowed downlink and uplink bandwidth for a particular ground station 110 with such information being updated in the event of a change in capability of the ground station 110. A satellite may store information that identifies other satellites that may communicate with a particular ground station in the form of a ground station client satellite (GSCS) list (GSCSL). A GSCSL may carry the capabilities of each satellite 106 on the list, which may include relative orbit time and distance of each satellite to each ground station, whether a particular satellite 106 is allowed to communicate with a ground station 110, and available uplink and downlink bandwidth. The satellite 106 may store information about the number of ISCL antennas for other satellites, RF parameters, and allowed and available ISCL bandwidth. In some cases, the satellite 106 stores mission parameters and the processing/computing capabilities of other satellites 106 (e.g., information about shareable computing resources).

A satellite may maintain a neighbor satellite network list (NSNL), which may include information about nearby satellites having ISCL capabilities. Whenever a satellite 106 comes into contact with a neighbor satellite via the ISCL, information about the neighbor satellite may be stored for future reference. Such information may include the neighbor satellite's ID, current location and orbital parameters of the neighbor satellite (which enables calculation of relative positioning and ISCL contact points and pass time), ISCL communication parameters, "communication link" quality, available and allowed bandwidth via ISCL, available and allowed bandwidth from the neighbor satellite to a ground station, neighbor satellite mission capabilities, neighbor satellite processing/computing (sharable) capabilities, and any other such information that may support or facilitate each other's satellite missions.

A neighbor satellite may also share/exchange a ground station network database with another satellite 106. If the neighbor satellite is a Relay Only Satellite (ROS), then the ROS may not maintain a ground station network database if the ROS cannot communicate with that ground station, but may use the ground station network database of a neighbor satellite 106 if the neighbor satellite may communicate with the ground station for relaying or routing of messages. In addition, neighboring satellites may exchange NSNLs. A satellite 106 may track updates to NSNLs. For example, a satellite 106 may send an updated NSNL to other satellites via ISCL. In another example, the satellite 106 shares an updated NSNL with a ground station 110 which then communicates the updated list to other authorized satellites 106 via unicast, broadcast, or multicast transmission.

A satellite 106 may use the information discussed above and stored thereon to create a routing table which may identify the shortest and most reliable "communication link" over which to send messages (e.g., message including a TC, TM data, or TD). The "communication link" could be either between a ground station 110 and a satellite 106 and/or between satellites to improve satellite to satellite communication by forming a dynamic Satellite Mesh Network (SMN) in space. The SMN and real time network routing tables may provide more effective and resilient transmissions with reduced latency.

As shown in FIGS. 1A and 6, the OBC of a satellite 106 includes an OBC application, session, and scheduler, which and payload monitoring. Typical satellite positioning requirements like Nadir pointing, sun tracking, imaging direction, maximum power tracking, and other similar commands are scheduled and managed by the OBC application.

The ADCS maintains the attitude of a satellite 106 in the desired orbit. The ADCS continuously generates sensor and actuator data as telemetry information. ADCS also takes specific pointing requests through telecommands from the payload or payload server. Ground stations 110 may also query for particular data from the ADCS through the TC/TM manager of the satellite 106. The ADCS refers to the ISCL attributes and NSNL, NSRT and maneuvers the orientation of a satellite to establish the ISCL with the neighboring satellites and/or the "communication link" with the GSs.

The EPS/PDN is responsible for power distribution, solar-based battery charging, thermal monitoring, battery health monitoring, and various critical power-related parameters. The EPS/PDN sends information related to these parameters through the TC/TM manager to a ground station 110 as a telemetry message.

The payload server is a notable element given its role as a distributed compute node within the space segment of the system 100. The payload server manages connected payloads, the mission, and ConOps. The payload server distributes the incoming commands from the TC/TM manager to the specific payload. The payload server also collects and, in some cases, processes data from the various payloads (recall that payloads generally correspond to various mission-specific sensors and actuators to perform multiple functions as scheduled and requested by the PPC). Meanwhile, the edge server hosts multiple edge applications to process data from the payloads or other sources onboard the satellite.

Example TC, TM, and TD exchange categories are shown in below in Table 1.

TABLE 1

| TC and TM Command and Data Exchange Categories | | | |
| --- | --- | --- | --- |
| | Ground Segment | Space Segment | Command Type |
| Tele-command | Send Command | Control On/Off | O |
| | Send Command | Set Parameters | P |
| | Send Command | Trigger Function (SAT Operations) | SF |
| | Send Command | Trigger Function (Mission/Payload Operations) | MF |
| | Send Command | Update Configuration | U |
| | Send Command | Query Data | Q |
| Telemetry | Run Diagnostics/Analysis | Send Telemetry Error | E |
| | Ack/data Handling | Send Telemetry status | T |
| | Data Handling/Analysis | Send Telemetry Data | |
| | Satellite Tracking | Send Beacon | B |
| | Satellite Monitoring | Send Health Status | H |
| Tele-data | Forward Process Payload/Mission Data | Send Mission/payload Data | D | may be responsible for managing flight control-specific activities and some of the mission-specific activities as requested by a payload, payload server, and/or edge server. The OBC also manages satellite diagnostics, health monitoring, power management, ADCS control, housekeeping, Example roles of the various modules shown and described with reference to FIGS. 1A and 6 in terms of origination, termination, encapsulation, de-capsulation, and forward/routing for TCs, TM data, and TD via uplink (UL) and downlink (DL) are shown below in Table 2.

TABLE 2

Ground Segment and Space Segment Module Rules

| Features/Roles | | Ground Segment | | | Satellite | TC/TM | Space Segment | | | | | | |
| --- | --- | --- | --- | --- | --- | --- | --- | --- | --- | --- | --- | --- | --- |
| | | | | | | | Obc App/ Secession/ | | | HW | Payload | | Edge |
| | | PCC | MFCC | GS | SDR | Manager | Scheduler | ADCS | EPS/PDN | Sub-System | Server | Payload | Server |
| TC (UL) | Originate | X | X | | | X | | | | | X | X | X |
| | Forward/routing | | | X | X | X | X | | | | X | | |
| | Terminate | | | | | X | X | X | X | X | X | X | X |
| | Encapsulate | | | X | | | | | | | | | |
| | De-capsulate | | | | X | | | | | | | | |
| TM (DL) | Originate | | | | | X | X | X | X | X | X | X | X |
| | Forward/Routing | | X | X | X | X | | | | | X | | |
| | Terminate | X | X | | | X | | | | | | | |
| | Encapsulate | | | | X | | | | | | | | |
| | De-capsulate | | | X | | | | | | | | | |
| TD (DL) | Originate | | | | | | X | X | X | X | X | X | X |
| | Forward/Routing | | X | X | X | X | | | | | X | | |
| | Terminate | X | | | | | | | | | | | |
| | Encapsulate | | | | X | | | | | | | | |
| | De-capsulate | | | X | | | | | | | | | |

Protocols for TCs, TM data, and TD according to example embodiments have the following high level characteristics. The origination of a command is from any entities of a ground station 110, a satellite 106, or a neighbor satellite 106. 2. The protocol is agnostic to RF bands and vendor radios. Underlying RF/Baseband L2/L1 protocols handle the attributes such as frame synchronization, re-transmission, and the like. Both telecommand and telemetry frames indicate the "start of the Frame" (SOF) to facilitate receiving and decoding of multiple packets on the receiver side. Each command may have delayed response (as the command may require some action to be taken in the satellite) and also one command may have multiple responses (e.g., periodic actions taken at the satellite for a particular command). Responses are sent through telemetry messages while tele-data messages are primarily used for sending mission-specific payload data as a response to a telecommand. The protocol also supports security functions, such as ciphering, deciphering, and authentication features—these features are optional and may be enabled or disabled at an individual command level. QoS may be ensured for various applications by having coordinated centralized scheduling, and the requesting module may specify the required QoS for any command to be scheduled. A single TC frame carries a single TC, however, multiple TC frames may be packed back to back in a single RF packet depending on the allowed bandwidth of the "communication link". The SOF and frame length of the TC frame allows the receiver to decode each TC frame by demarking the SOF of every TC frame.

A message's originator may be from the ground or on-board satellite segments—the TCs within the on-board satellite may follow the same frame format as described above. A message's destination could be a single destination (unicast) or more than one destination (broadcast or multicast).

FIG. 8 illustrates an example frame format for a TC while Table 3 and associated description below define the fields depicted in FIG. 8.

TABLE 3

TC Frame Field Info

| Fields | Size | Range |
| --- | --- | --- |
| SOF | 1 Byte | 0xA5 |
| TC Ctrl | 1 Byte | 0 to 255 |
| MCC | 1 Byte | 0 to 255 |
| MCC Version | 1 Byte | 0 to 255 |
| Mission/Sensor Type | 1 Byte | 0 to 255 |
| Time Stamp | 4 Bytes | UTC |
| Sequence No | 2 Bytes | 0 to 65535 |
| SAT Id | ½ Byte | 0 to 32767 |
| GS Id | ½ Byte | 0 to 32767 |
| QoS | 1 Byte | 0 to 255 |
| SA Id | ½ Byte | 0 to 32767 |
| DA Id | ½ Byte | 0 to 32767 |
| TC Id | 1 Byte | 0 to 255 |
| TC Len | ½ Byte | 0 to 32767 |
| TC Data | Tc Len | |
| CRC | 1 Byte | 0 to 255 |
| C-MAC/H-MAC | 32 Bytes | |

The Start of the frame (SOF) helps detect the first byte of the frame structure and reduces the computing requirement for searching. The SOF may be one byte in size and holds the value of 0xA5 as default. TC Ctrl holds the information required for the Telecommand data decoding and has a size of one byte. Table 4 illustrates various possibilities for the TC Ctrl field.

TABLE 4

TC Control Field Info

| Bits/Value | 0 | 1 |
| --- | --- | --- |
| b'0 | GND to SAT | SAT to SAT |
| b'1 | Tx | Re-Tx |
| b'2 | | 00 - unicast |
| b'3 | | 01 - Multicast |
| | | 10 - Broadcast |
| | | 11 - Reserved |
| b'4 | Un-authenticated | Authenticated |
| b'5 | Unencrypted | Encrypted |
| b'6 | No MCC Fields | MCC Fields Available |
| b'7 | Reserved | |

The Mission Control Center (MCC) field in Table 3 specifies the MCC control field command domain and is optional based on TC Ctrl b'6. MCC version is a field that contains the MCC version being used and is also based on TC Ctrl b'6.

The Mission/sensor type field contains the mission and sensor types used. This field is optional based on TC Ctrl b'6. The Time Stamp field contains a UTC time stamp of when the ground station 110 transmitted the TC command. The Sequence No holds the sequence number of a message that continually increments, and is maintained by the originator of the TC message.

SAT Id refers to the unique identifier of a specific satellite or group of satellites. In case of a group of satellites, the group satellite Id may be obtained while scheduling the multicast TC. The SAT Id facilitates both unicast and multicast modes of messages and may be one or two bytes in size. The extension bit (7th bit) of the 1st byte denotes the 2nd-byte availability. Meanwhile, GS Id is a field containing a unique identifier of a specific ground station through which a TC passes, and may be one or two bytes. The extension bit (7th bit) of the 1st byte denotes the availability of the 2nd-byte.

The QoS field includes information to determine the priority of the TC message sent from a ground station 110 to a satellite 106 to provide better service for the priority applications and ranges between 0 and 255. A higher QoS value denotes higher priority.

The Source Application (SA) Id identifies the source entity where a message originated. For example, the sources may be the PCC, the MFCC, or a payload. The SA Id field may be one or two bytes with the extension bit (7th bit) of the 1st byte denoting the 2nd-byte availability.

Destination Application (DA) Id refers to the final destination entity that the TC message that needs to reach. For example, the destination module could be the ADCS, the OBC, the EPS/PDN, the payload server, the payload, and/or the like. DA Id may be one or two bytes with the extension bit (7th bit) of the 1st byte denoting the 2nd-byte availability.

TC Id is a field that includes the unique command value with its own set of parameters. Each Telecommand Id belongs to multiple categories of messages in various modules and functionalities in a satellite 106. For example, there could be several commands for an ADCS module and each command and has an assigned TC Id. The size of the TC Id is one byte, but may be extended to two bytes if needed.

TC length (TC Len) refers to the overall size of the parameters associated with the given TC Id in the current frame. The size of the length field may be one or two bytes, and the extension bit (7th bit) of the 1st byte denotes the availability of the 2nd-byte.

The TC data field contains the variable set of parameters (type, length, and value) for the given TC Id in TLV (Type, Length, and Value) format. Each parameter is pre-agreed to be used at both source and destination entities.

The CRC field contains the checksum of the given frame, including SOF to the end of the TC payload.

The CMAC/HMAC field contains cipher-based authentication codes (CMAC) and/or hash-based authentication codes (HMAC) used for securing the TC message.

Figure 9:
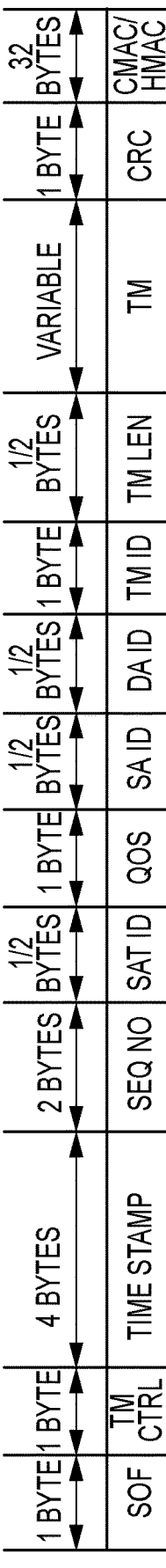
FIG. 9 illustrates a frame format for telemetry communication according to at least one example embodiment.

FIG. 9 illustrates an example format for a telemetry TM frame and is discussed in more detail below with reference to Table 5.

TABLE 5

| TM Frame Field Info | | |
|---|---|---|
| Fields | Size | Range |
| SOF | 1 Byte | 0xA5 |
| TM Ctrl | 1 Byte | 0 to 255 |
| MCC | 1 Byte | 0 to 255 |
| MCC Version | 1 Byte | 0 to 255 |
| Mission/Sensor Type | 1 Byte | 0 to 255 |
| Time Stamp | 4 Bytes | UTC |
| Sequence No | 2 Bytes | 0 to 65535 |
| SAT Id | ½ Byte | 0 to 32767 |
| QoS | 1 Byte | 0 to 255 |
| SA ID | ½ Byte | 0 to 32767 |
| DA ID | ½ Byte | 0 to 32767 |
| TM ID | 1 Byte | 0 to 255 |
| TM Len | ½ Byte | 0 to 32767 |
| TM Data | TCLen | |
| CRC | 1 Byte | 0 to 255 |
| C-MAC/H-MAC | 32 Bytes | |

The Start of the frame (SOF) helps detect the first byte of the frame structure an reduces the computing requirement for searching. The SOF field is one byte in size and holds the value of 0xA5 as default.

TM Ctrl includes information required for the Telemetry data decoding and is one byte in size. Table 6 below illustrates this field in more detail.

TABLE 6

| TM Control Field Info | | |
|---|---|---|
| BITS/VALUE | 0 | 1 |
| b'0 | SAT to GND | SAT TO SAT |
| b'1 | Tx | Re-Tx |
| b'2 | | 00 - unicast |
| b'3 | | 01 - Multicast |
| | | 10 - Broadcast |
| | | 11 - Reserved |
| b'4 | Un-authenticated | Authenticated |
| b'5 | Unencrypted | Encrypted |
| b'6 | No MCC Fields | MCC Fields available |
| b'7 | | Reserved |

The MCC field specifies the MCC control command domain. This field is optional based on TM Ctrl b'6. The MCC version field contains the MCC version being used, and is also optional based on TM Ctrl b'6.

The Mission/sensor type field contains the mission and sensor types used. This field is optional based on TC Ctrl b'6. The Time Stamp field contains a UTC time stamp from when the satellite transmitted the TM message. The Sequence No holds the sequence number of a message that continually increments for each TM message, and is maintained by the originator of the TM message.

SAT Id contains the unique identifier of the satellite transmitting the TM message. The extension bit (7th bit) of the 1st byte denotes the 2nd-byte availability.

The QoS field includes information to determine the priority of the TM message sent from a satellite 106 to a ground station 110 to provide better service for the priority applications and ranges between 0 and 255. A higher QoS value denotes higher priority.

The Source Application (SA) Id identifies the source entity where a message originated. For example, the sources may be the ADCS, OBC, EPS/PDN, payload server, payload, and/or the like. The SA Id field may be one or two bytes with the extension bit (7th bit) of the 1st byte denoting the 2nd-byte availability.

Destination Application (DA) Id identifies the final destination entity that the TM message that needs to reach. For example, the destination could be the PCC, the MFCC, and/or another element of the ground system 108. DA Id may be one or two bytes with the extension bit (7th bit) of the 1st byte denoting the 2nd-byte availability.

TM Id contains a unique telemetry value associated with a group of telemetry parameters. Each Telemetry Id belongs to multiple categories of data collected from various modules in the satellite 106. In some but not all cases, the TM Id is the same as the TC Id of the TC command for which the TM message is a response. The size of the TM Id may be one byte.

TM Length (TM Len) is a field that identifies the overall size of the parameters associated with the given TM Id in the current frame. The size of the TM Len field may be one or two bytes with the extension bit (7th bit) of the 1st byte denoting the availability of the 2nd-byte.

TM Data is a field that contains the variable set of parameters for the given TM Id in TLV (Type, Length, and Value) format. Each parameter is the pre-agreed format used at both source and destination entities.

The CRC field contains the checksum of the given frame, including the SOF to the end of the TM payload.

The CMAC/HMAC field contains cipher-based authentication codes (CMAC) and/or hash-based authentication codes (HMAC) used for securing the TM message.

FIG. 10 illustrates an example format for a TD frame and is discussed below with reference to Table 7.

TABLE 7

| TD Frame Field Info | | |
| --- | --- | --- |
| Fields | Size | Range |
| SOF | 1 Byte | 0xA5 |
| TC Ctrl | 1 Byte | 0 to 255 |
| MCC | 1 Byte | 0 to 255 |
| MCC Version | 1 Byte | 0 to 255 |
| Mission/Sensor Type | 1 Byte | 0 to 255 |
| Time Stamp | 4 Byte | UTC |
| Sequence No | 2 Bytes | 0 to 65535 |
| SAT Id | ½ Byte | 0 to 32767 |
| Qos | 1 Byte | 0 to 255 |
| SA Id | ½ Byte | 0 to 32767 |
| DA Id | ½ Byte | 0 to 32767 |
| TD Id | 1 Byte | 0 to 255 |
| TD Len | ½ Byte | 0 to 32767 |
| TD Data | TC Len | |
| CRC | 1 Byte | 0 to 255 |
| C-MAC/H-MAC | 32 Bytes | |

The Start of the frame (SOF) helps detect the first byte of the frame structure and reduces the computing requirement for searching. The SOF field is one byte in size and holds the value of 0xA5 as default.

TM Ctrl includes information required for the Teledata decoding and is one byte in size. Table 8 below illustrates this field in more detail.

TABLE 8

| TD Control Field Info | | |
| --- | --- | --- |
| Bits/Value | 0 | 1 |
| b'0 | SAT to GND | SAT to SAT |
| b'1 | Tx | Re-Tx |

TABLE 8-continued

| TD Control Field Info | | |
| --- | --- | --- |
| Bits/Value | 0 | 1 |
| b'2 | | 00 - unicast |
| b'3 | | 01 - Multicast |
| | | 10 - Broadcast |
| | | 11 - Reserved |
| b'4 | Un-authenticated | Authenticated |
| b'5 | Unencrypted | Encrypted |
| b'6 | No MCC Fields | MCC Fields Available |
| b'7 | | Reserved |

The MCC field specifies the MCC control command domain. This field is optional based on TM Ctrl b'6. The MCC version field contains the MCC version being used, and is also optional based on TM Ctrl b'6.

The Mission/sensor type field contains the mission and sensor types used. This field is optional based on TC Ctrl b'6. The Time Stamp field contains a UTC time stamp from when the satellite transmitted the TD message. The Sequence No field holds the sequence number of a message that continually increments for each TD message, and is maintained by the originator of the TD message.

SAT Id contains the unique identifier of the satellite or group of satellites transmitting the TD message. The extension bit (7th bit) of the 1st byte denotes the 2nd-byte availability.

The QoS field includes information to determine the priority of the message exchanges sent from a satellite 106 to a ground station 110 to provide better service for the priority applications and ranges between 0 and 255. A higher QoS value denotes higher priority.

The Source Application (SA) Id identifies the source entity where a message originated. For example, the sources may be the payload server, edge server, payload, logger and/or the like. The SA Id field may be one or two bytes with the extension bit (7th bit) of the 1st byte denoting the 2nd-byte availability.

Destination Application (DA) Id identifies the final destination entity that the TD message that needs to reach. For example, the destination could be the PCC, the MFCC, and/or another element of the ground system 108. DA Id may be one or two bytes with the extension bit (7th bit) of the 1st byte denoting the 2nd-byte availability.

TD Id contains a unique a unique ID associated with the teledata. For example, if a particular mission has more than one category of data to send, this field is used to distinguish between categories. The size of the TD Id may be one byte.

TD Length (TD Len) is a field that identifies the overall size of the parameters associated with the given TD Id in the current frame. The size of the TD Len field may be one or two bytes with the extension bit (7th bit) of the 1st byte denoting the availability of the 2nd-byte.

TD Data is a field that contains the variable set of parameters for the given TD Id in TLV (Type, Length, and Value) format. Each parameter is the pre-agreed format used at both source and destination entities.

The CRC field contains the checksum of the given frame, including the SOF to the end of the TD payload.

The CMAC/HMAC field contains cipher-based authentication codes (CMAC) and/or hash-based authentication codes (HMAC) used for securing the TD message.

Figure 11:
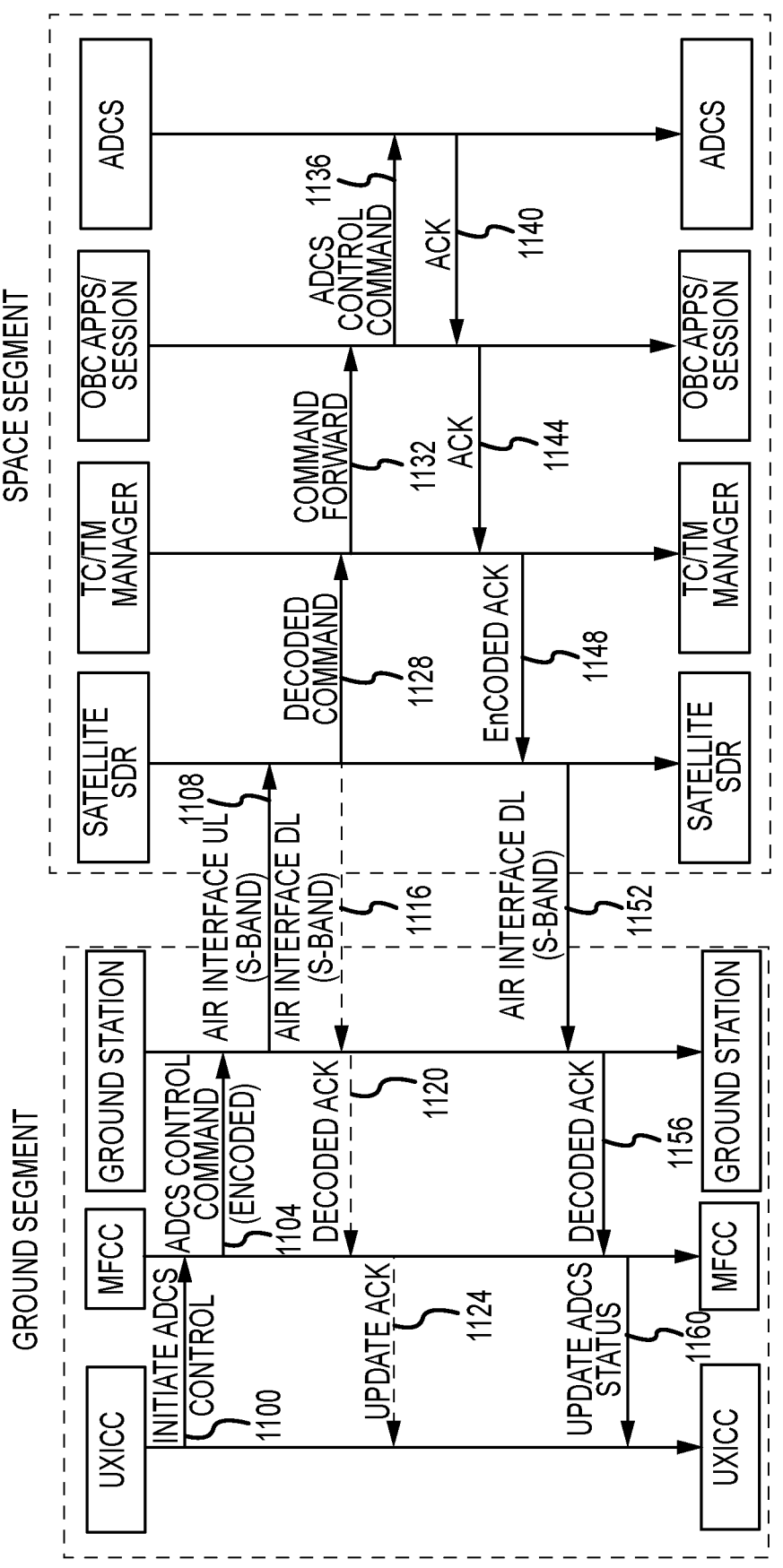
FIG. 11 illustrates a message diagram for initiating a telecommand according to at least one example embodiment.
Figure 12:
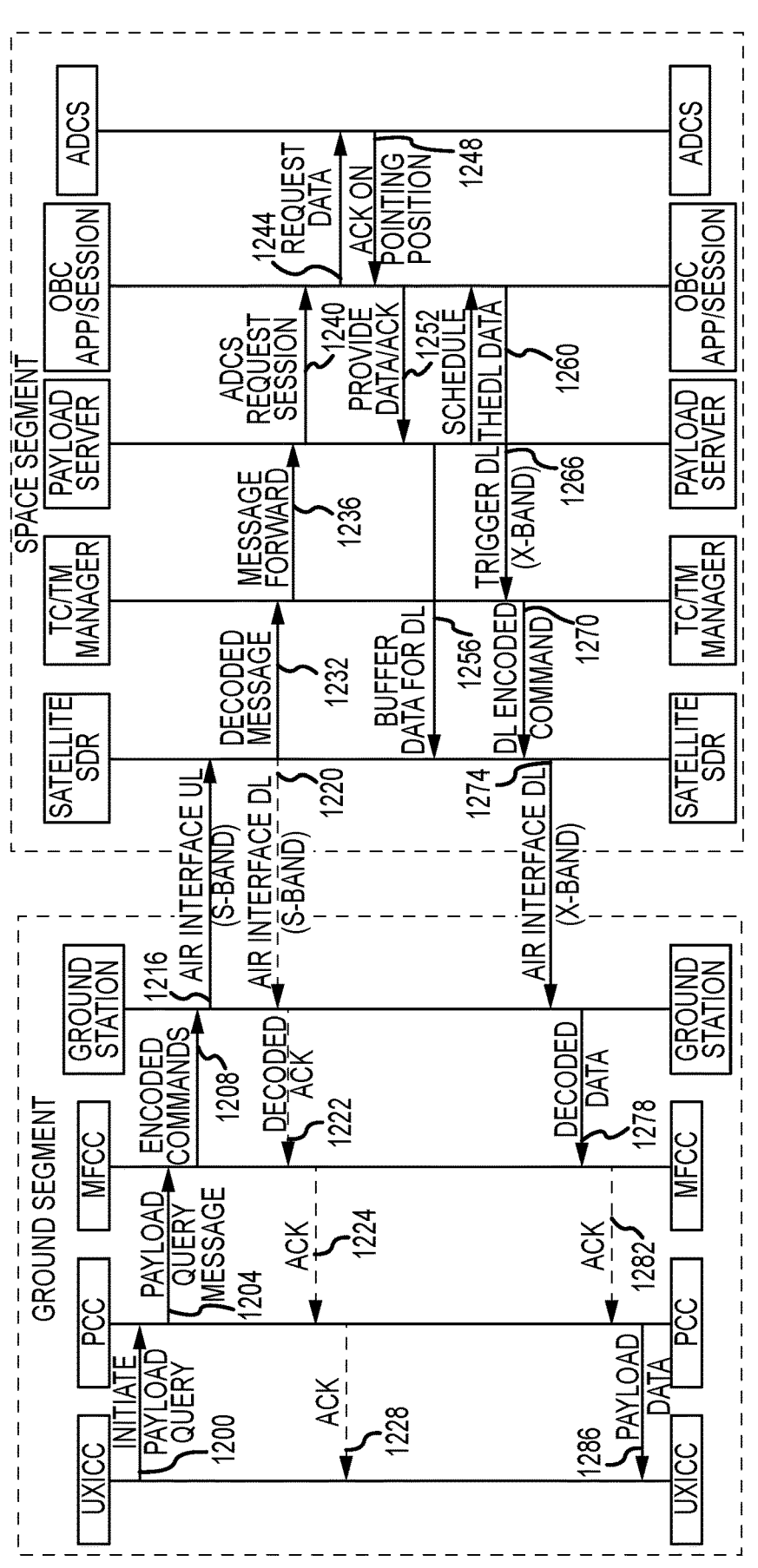
FIG. 12 illustrates another message diagram for initiating a telecommand according to at least one example embodiment.
Figure 13:
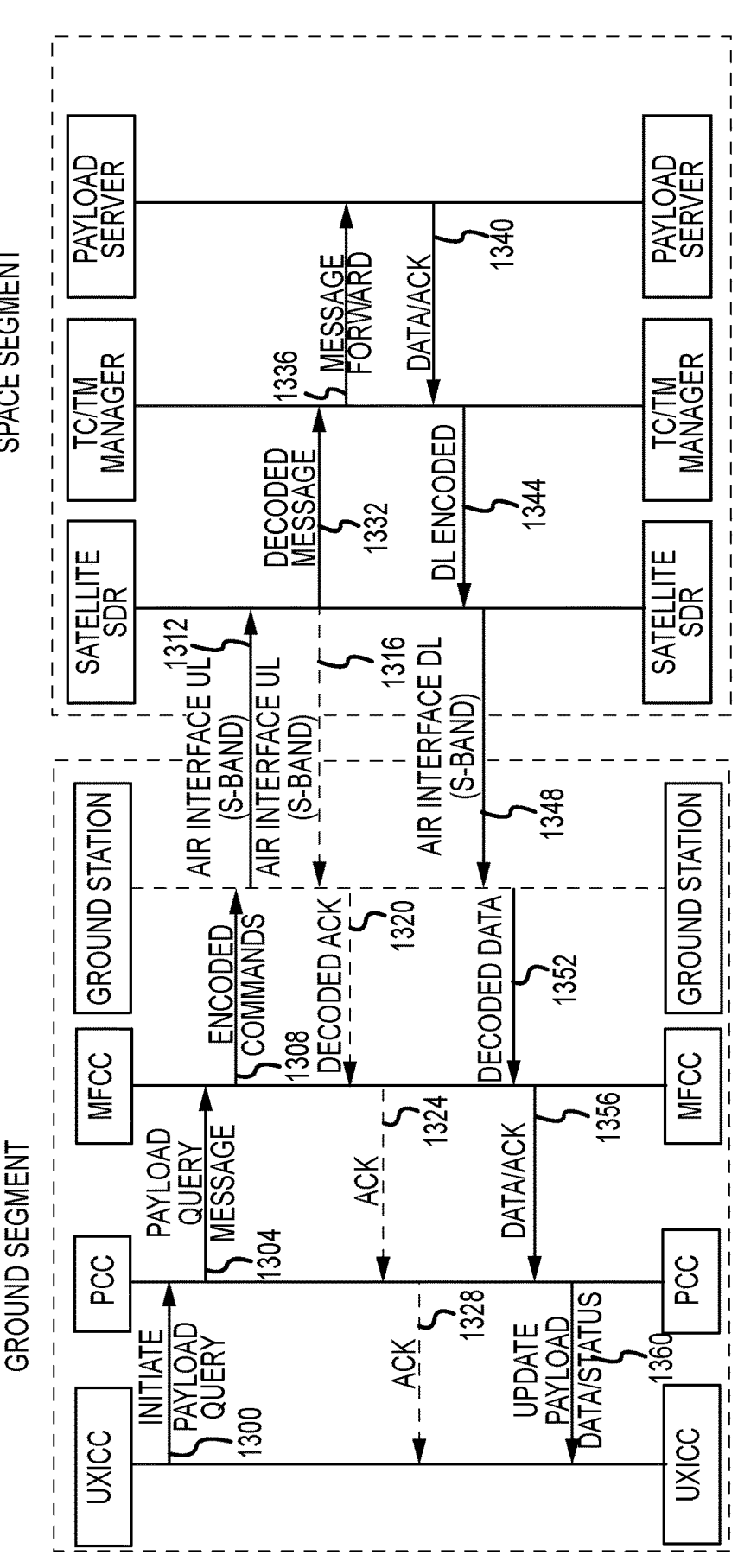
FIG. 13 illustrates another message diagram for initiating a telecommand according to at least one example embodiment.
Figure 14:
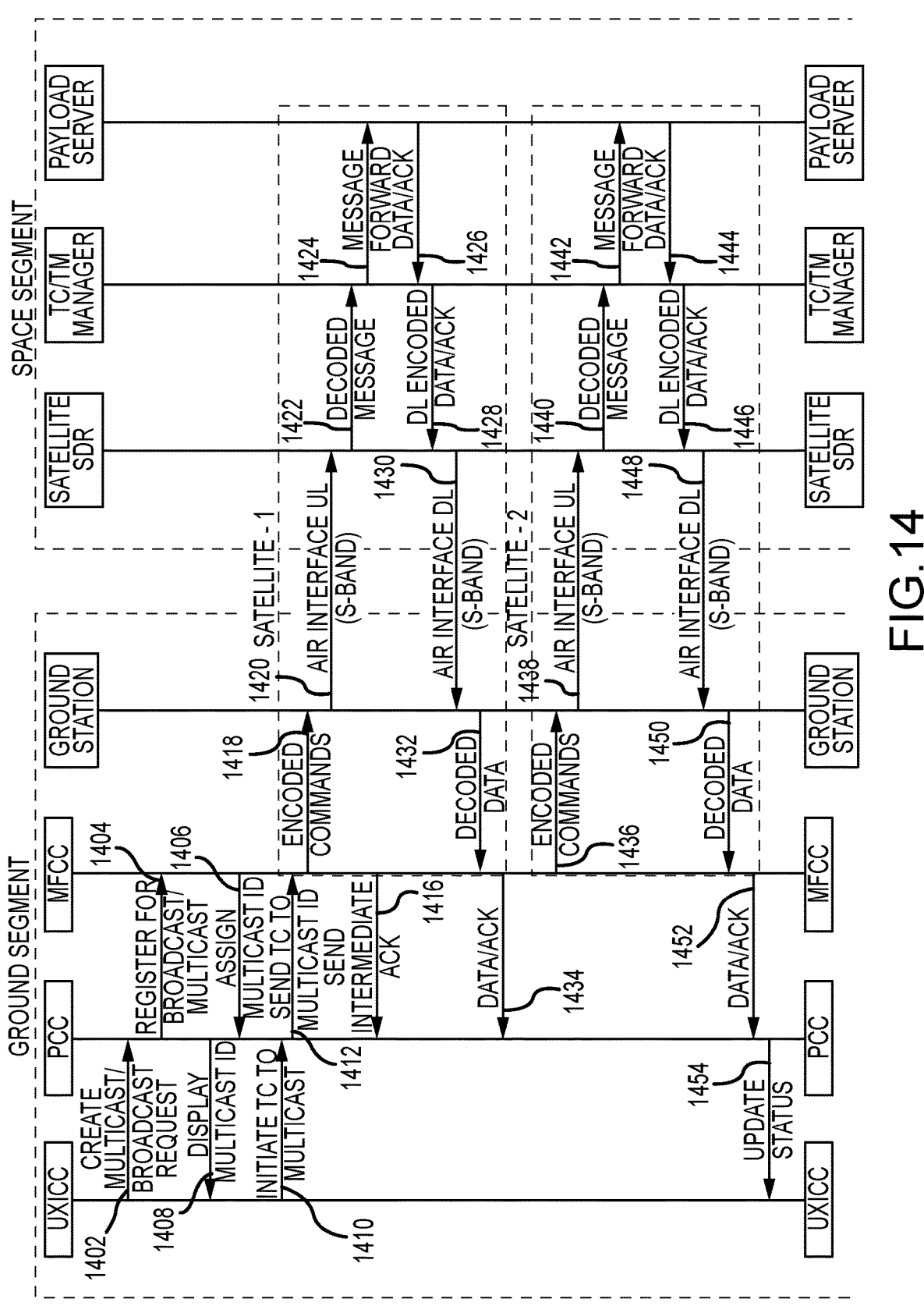
FIG. 14 illustrates another message diagram for initiating a broadcast and multicast telecommand according to at least one example embodiment.

FIGS. 11-14 are message diagrams showing transmissions messages in various scenarios. For example, FIG. 11 illustrates initiating a TC from an MFCC, FIG. 12 illustrates initiating a TC from a PCC and receiving TD via an X-band interface, FIG. 13 illustrates initiating a TC from a PCC via S-band and receiving TM data via S-band, and FIG. 14 illustrates initiating a multicast or broadcast TC from a PCC.

It should be appreciated that the steps illustrated in these message diagrams and in any other methods described herein are for the purpose of illustration only and do not limit the scope of the present disclosure. More or fewer steps than shown may be performed, and in some cases, in a different order than that shown in the figures. For example, the diagrams show generating ACKs for successful trans-missions and command completion, however, it should be appreciated that NAKs may instead be generated in the event of a failed transmission or failure of a payload to carry out a command. Some steps may occur substantially simul-taneously, and some steps may be performed by an element other than the element depicted. FIGS. 11-14 and other methods described herein may be carried out according to the TM data, TC, and TD protocol formats described above. Although not explicitly explained in all cases, it should be appreciated that the receipt of a particular request or trans-mission in one step automatically triggers the next step.

FIG. 11 illustrates steps 1100 to 1160 for initiating a TC from an MFCC. At 1100, a user initiates a TC, such as a command for ADCS control, at the UXICC by providing one or more inputs thereto. At 1104, the MFCC encodes the TC (or TCs) and sends the encoded command (one or more TC frames) to a ground station 110. At 1108, the ground station 110 transmits the encoded command to the SDR of a satellite 106 over an S-band interface where the command is decoded. At 1116, the satellite SDR transmits an encoded acknowledgement that the command was successfully received to the ground station 110, which then decodes the acknowledgement at 1120 and sends a notification of the acknowledgement to the UXICC for the user. At 1128, the SDR sends the decoded command to the TC/TM manager, forwards the command to the OBC application at 1132. The OBC application interprets the command and sends a cor-responding control signal the ADCS to carryout the com-mand at 1136. At 1140, the ADCS returns an acknowledge-ment ACK that the command was performed to the OBC application, which forwards the ACK to the TC/TM man-ager at 1144. The TC/TM manager encodes the ACK and sends the encoded ACK (e.g., as one or more TC frames) to the SDR at 1148. Thereafter, at 1152, the SDR sends the encoded ACK over the S-band interface to the correspond-ing S-band interface of the ground station 110. The ground station decodes the ACK and sends the decoded ACK to the MFCC at 1156. Thereafter, the MFCC sends a notification to the UXICC that notifies the user of the completed command and/or the updated ADCS status at 1160.

FIG. 12 illustrates steps 1200 to 1286 for initiating a TC from a PCC and receiving TD via an X-band interface. At 1200, a user initiates a TC as a payload query at the UXICC and sends the query to the PCC. At 1204, the PCC generates a payload query message that contains TC and sends the same to the MFCC. At 1208, the MFCC encodes and sends the message as one or more TC commands to the ground station 110 for transmission over the S-band interface at 1216 to the satellite SDR. At 1220, the SDR generates and sends an encoded acknowledgement to the ground station 110. Thereafter, the ground station 110 decodes the acknowl-edgement at 1222 and forwards the decoded acknowledge-ment to the MFCC. The decoded acknowledgement is forwarded from the MFCC to the PCC at 1224 and then to the UXICC at 1228 to notify the user of a successful transmission from the ground station 110 to the satellite 106. At 1232, the SDR decodes the command and sends the decoded command message to the TC/TM manager, which forwards the decoded command message to the payload server at 1236. At 1240, the payload server interprets the decoded message as being intended for the ADCS and sends a request to the OBC application to establish a session with the ADCS. The OBC application interprets the request, establishes a session with ADCS and requests the data called for by the query at 1244. In this example, the query called for data on a pointing position of the satellite 106 as determined by the ADCS. Thus, at 1248, the ADCS sends data indicative of the pointing position and an acknowledge-ment that the query is complete to the OBC application. The OBC application forwards the data and acknowledgement (the data itself may function as an ACK) to the payload server at 1252. At 1256, the payload server sends the data to a DL buffer of the SDR which bypasses the TC/TM man-ager. Shortly thereafter or substantially simultaneously, at 1260, the payload server schedules DL transmission of the payload data and provides scheduling information to the OBC application. At 1266, the OBC application sends a request to the TC/TM manager (while bypassing the payload server) to trigger an X-band DL "communication link". At 1270, the TC/TM manager generates a command (e.g., in TD frame format) in response to the request in 1266 and sends a DL encoded command to the SDR where the payload data (teledata) is waiting in buffer. At 1274, the SDR sends an encoded command signal with the payload data to the ground station 110 where the signal is decoded to provide the decoded payload data to the MFCC at 1278. At 1282, the decoded payload data are sent to the PCC, which in turn sends the payload data to the UXICC at 1286 for viewing and/or analysis by the user.

FIG. 13 illustrates steps 1300 to 1360 for initiating a TC from a PCC via S-band and receiving TM data via S-band "communication link". At 1300, the user initiates a payload query at the UXICC which sends the query to the PCC. The PCC generates a query message and sends the message to the MFCC at 1304. At 1308, the MFCC encodes and sends the message (e.g., as one or more TC commands in TC frame format) to the ground station 110. Thereafter, the ground station 110 sends the command(s) over the S-band interface to the satellite SDR at 1312. At 1316, the SDR returns an encoded ACK to the ground station 110 indicating success-ful receipt of the command. The encoded ACK is decoded by the ground station 110 at 1320 and forwarded to the UXICC through the PCC in steps 1324 and 1328. Meanwhile, at 1332, the SDR decodes the command sends the decoded command or message to the TC/TM manager, which for-wards the message that includes a request for the data called for by the initial query to the payload server at 1336. The payload server processes the request and returns data (e.g., TM data generated by processors, payloads, IOs and other such hardware and software applications and resources) to the TC/TM manager at 1344. At 1344, the TC/TM manager encodes the data and sends the encoded data (e.g., in a TM frame format) to the SDR. The SDR sends the encoded data over the S-band interface to the ground station 110 at 1348, where the ground station 110 decodes and sends the data to the MFCC at 1352. Thereafter, the MFCC sends the now decoded data to the PCC at 1356 and the PCC sends the data to the UXICC for viewing and analysis at 1360.

FIG. 14 illustrates steps 1402 to 1454 for initiating a multicast or broadcast TC from a PCC. At 1402, the user of the UXICC creates a request for sending a multicast or broadcast transmission (command) and sends the request to the PCC. The PCC registers the request with the MFCC at 1404. At 1406, the MFCC assigns an ID to the transmission and returns the ID to the PCC. At 1408, the PCC sends the ID to the UXICC for display. At 1410 the user initiates a TC using the ID and sends the TC to the PCC, which sends the TC to the MFCC. At 1416, the MFCC returns an ACK to the PCC (which may also be sent to the UXICC) indicating a successful multicast or broadcast transmission request. At 1418 and 1436, the MFCC generates (e.g., simultaneously generates) two separate encoded TC commands (in TC frame format) that are sent to the ground station 110. As illustrated, steps 1418 to 1434 relate to a first satellite and steps 1436 to 1454 relate to a second satellite. At 1420 and 1438, the SDR sends two separate encoded commands to a respective satellite SDR. Notably, the multicast or broadcast TC is generated as a single command at the MFCC but transmitted from the "communication link" layer (ground station) in two separate transmissions to account for potentially different pass times of each satellite. At 1422 and 1440, each respective SDR decodes the command and forwards the decoded command or message to a respective TC/TM manager which, at 1424 and 1442, interprets the command into a request for data from the payload server. At 1426 and 1444, each respective payload server returns the requested data from the payload server (the data itself may be an ACK) to the TC/TM manager. Thereafter, at 1428 and 1446, each TC/TM manager formats and encodes the data (e.g., in TM or other suitable frame format) and sends the same to a respective SDR. At 1430 and 1448, each SDR sends the encoded data over a respective S-band interface back to the ground station 110, where the data is decoded and forwarded to the MFCC at 1434 and 1452 before the UXICC receives the data and/or updates status information at 1454 based on the received data from 1434 and 1452. Here, it should be appreciated that each satellite may be associated with the same or different MFCC. In the case of different MFCCs, the MFCC for one satellite may forward the TC from 1412 to the other MFCC.

In view of the description and figures, it should be appreciated that example embodiments provide a satellite 106 comprising a "communication link" interface (X-band and/or S-band) and at least one processor and at least one memory (e.g., processor and memory of the OBC). The at least one processor and the at least one memory are configured to support multiple tenant applications in a multi-tenancy cloud-computing environment. Two or more of the multiple tenant applications establish isolated "communication link" channels with a ground station utilizing the "communication link" interface. For example, a first tenant application in the two or more of the multiple tenant applications establishes a first "communication link" channel, and a second tenant application in the two or more of the multiple tenant applications establishes a second "communication link" channel. The first "communication link" channel utilizes a different security protocol than the second "communication link" channel. For example, the first "communication link" channel is at least one of encrypted and decrypted differently than the second "communication link" channel. In some cases, different encryption keys are used for the first "communication link" channel as compared to the second "communication link" channel. In at least one embodiment, the satellite 106 is configured to transmit an emergency telecommand to another satellite 106 via a sidelink (e.g., ISCL). In some examples, the emergency telecommand is transmitted to the another satellite via a ground station 110. The emergency telecommand may be transmitted autonomously. In some cases, at least one tenant application of the multiple tenant applications is configured to consume unallocated bandwidth from the "communication link" interface in response to detecting an emergency condition. In some examples, at least one tenant application of the multiple tenant applications is configured to offload a task to another satellite. For example, the task is offloaded by sending mission and/or task information to the another satellite via at least one of a ground station and a sidelink. At least one tenant application of the multiple tenant applications shares information with another satellite, and the information comprises data selected from the following: satellite ID, current location and orbital parameters, sidelink "communication link" parameters, "communication link" quality and available and allowed data bandwidth via sidelink, "communication link" quality and available and allowed data bandwidth from the neighbor satellite to a ground station "communication link" (download and/or upload), satellite mission capabilities, sharable computing resources, sharable memory resources, sharable sensors, cameras, and any HW accelerators, and/or sharable battery power resources. The information is shared via at least one of a sidelink and a ground station. Data stored in the at least one memory, when processed by the at least one processor, enables the satellite to estimate a nearest and/or shortest sidelink path for a neighbor satellite based on orbital parameters of the neighbor satellite. The orbital parameters include at least one of relative orbit time, relative orbit distant, and shortest network relay path. Data stored in the at least one memory, when processed by the at least one processor, enables the satellite to create and maintain a shortest/nearest "communication link" path table. Data stored in the at least one memory, when processed by the at least one processor, enables the satellite to perform ground station "communication link" (e.g., radio link, an optical link) scanning to identify a new ground station or to identify new satellite neighbors.

In view of the above, at least one example embodiment provides a system comprising a ground station; and a satellite comprising a "communication link" interface and at least one processor and at least one memory. The at least one processor and the at least one memory are configured to support multiple tenant applications in a multi-tenancy cloud-computing environment, and two or more of the multiple tenant applications establish isolated "communication link" channels with the ground station utilizing the "communication link" interface.

Some embodiments provide for a satellite that includes a payload that generates payload data, at least one processor, and at least one memory including data that enables the at least one processor to process commands from multiple users according to a same protocol, and access the payload data, the payload, or both based on the processed commands.

Example embodiments may be configured as follows:
(1) A system comprising:
  a ground station comprising at least one processor and at least one memory including instructions, that when executed by the at least one processor, cause the at least one processor to: generate a command for one or more satellites based on a received request; identify a time for communicating the command to the one or more satellites based on a location of the one or more satellites relative to an antenna of the ground station; and
  schedule the command for transmission to the one or more satellites based on a type of transmission for the command and the identified time.
(2) The system of (1) wherein the command is encoded.
(3) The system of one or more of (1) to (2), wherein, upon detecting a transmission failure of the command to the one or more satellites, the at least one processor reschedules transmission of the command.

(4) The system of one or more of (1) to (3), wherein the at least one processor schedules the command for transmission from the ground station when the antenna of the ground station is at least one of: a closest antenna to a satellite of the one or more satellites and a satellite having a shortest "communication link" pass time.

(5) The system of one or more of (1) to (4), wherein the at least one processor communicates with another ground station and schedules the command for transmission from the another ground station when an antenna of the another ground station is at least one of: closer to the satellite of the one or more satellites than the antenna of the ground station and having a shortest "communication link" pass time with the ground station.

(6) The system of one or more of (1) to (5), wherein the command comprises a header that identifies which of the one or more satellites should execute the command.

(7) The system of one or more of (1) to (6), wherein the type of transmission method for the command comprises a unicast transmission to a single satellite of the one or more satellites.

(8) The system of one or more of (1) to (7), wherein the type of transmission method for the command comprises a multicast transmission to some but not all of the one or more satellites.

(9) The system of one or more of (1) to (8), wherein the multicast transmission is scheduled at a layer of the ground station other than a "communication link" layer that includes the antenna.

(10) The system of one or more of (1) to (9), wherein the "communication link" layer addresses individual satellites in the one or more satellites when transmitting the command.

(11) The system of one or more of (1) to (10), wherein the type of transmission method for the command comprises a broadcast transmission to all of the one or more satellites.

(12) The system of one or more of (1) to (11), wherein the command is authenticated at the one or more satellites.

(13) The system of one or more of (1) to (12), wherein the at least one processor schedules the command for transmission to an intermediate satellite that relays the command to a destination satellite of the one or more satellites.

(14) The system of one or more of (1) to (13), wherein the command comprises an identifier of the destination satellite used by the intermediate satellite to forward the command to the destination satellite.

(15) The system of one or more of (1) to (14), wherein the antenna of the ground station comprises an S-band transceiver that transmits the command.

(16) The system of one or more of (1) to (15), wherein the antenna of the ground station comprises an X-band transceiver that receives payload data from the one or more satellites.

(17) The system of one or more of (1) to (16), wherein the at least one processor schedules the command for transmission based on an assigned quality of service associated with an application that executes the command.

(18) The system of one or more of (1) to (17), further comprising: the one or more satellites, wherein the at least one processor receives and processes telemetry information and/or payload data from the one or more satellites.

(19) The system of one or more of (1) to (18), wherein the one or more satellites are configured to forward the command to a respective tenant application within the satellite.

(20) The system of one or more of (1) to (19), wherein the one or more satellites are configured to forward the command to another ground station based on a destination identifier contained within the command.

(21) The system of one or more of (1) to (20), wherein the one or more satellites are configured to forward the telemetry information and/or the payload data to a respective tenant application within the satellite.

(22) A system comprising:
a satellite comprising at least one processor and at least one memory including instructions, that when executed by the at least one processor, cause the at least one processor to:
receive a command from a ground station;
determine whether the command is for the satellite or for another satellite;
when the command is for the satellite, send the command to at least one resource of the satellite to perform a function based on the command; and
when the command is intended for the another satellite, send the command over an inter satellite "communication link."

(23) The system of (22), further comprising: one or more additional satellites including the another satellite.

(24) The system of one or more of (22) to (23), wherein the at least one processor sends the command over the inter satellite "communication link," such as a sidelink, to the one or more additional satellites.

(25) The system of one or more of (22) to (24), wherein the at least one processor decodes and/or authenticates the command before sending the command over the inter satellite "communication link."

(26) The system of one or more of (22) to (25), wherein the at least one processor re-encodes the command before sending the command over the inter satellite "communication link."

(27) The system of one or more of (22) to (26), wherein the one or more additional satellites include a relay-only satellite that does not communicate with the ground station.

(28) The system of one or more of (22) to (27), wherein the at least one resource corresponds to a payload server that manages a plurality of applications for a plurality of tenants, an edge server that hosts edge applications to process data onboard the satellite, one or more systems that manage power functions for the satellite, and/or one or more systems that manage positioning of the satellite.

(29) The system of one or more of (22) to (28), wherein the instructions including instructions, that when executed by the at least one processor, cause the at least one processor to collect and schedule transmission of satellite information to the ground station.

(30) The system of one or more of (22) to (29), wherein the satellite information includes telemetry information and/or payload data collected by the satellite and/or by one or more other satellites.

(31) The system of one or more of (22) to (30), wherein the telemetry information and/or the payload data are collected in accordance with the command.

(32) The system of one or more of (22) to (31), wherein the telemetry information and/or the payload data are collected autonomously.

(33) The system of one or more of (22) to (32), wherein the telemetry information and/or the payload data are collected based on internal event and/or triggers within the satellite.

(34) The system of one or more of (22) to (33), wherein the at least one processor encodes the satellite information before sending the satellite information to the ground station.

(35) The system of one or more of (22) to (34), further comprising: the ground station.

(36) A method comprising:
    generating a command for one or more satellites based on input received through a user interface;
    scheduling the command for transmission to the one or more satellites from a selected ground station, from among a plurality of ground stations, based on positioning of the one or more satellites and a type of transmission for the command; and
    sending the command from the selected ground station to the one or more satellites based on the scheduling.

(37) The method of (36), wherein generating the command includes encoding the command.

(38) The method of one or more of (36) to (37), wherein the command causes one or more systems onboard the one or more satellites to perform at least one function instructed by the command.

(39) The method of one or more of (36) to (38), wherein the one or more systems include at least one payload server that controls sensors of the one or more satellites to collect payload data, at least one power management system that manages power for the one or more satellites, and/or one or more navigation systems that manage positioning of the one or more satellites.

(40) The method of one or more of (36) to (39), further comprising:
    receiving, by the one or more satellites, the command from the selected ground station; decoding the received command;
    determining a destination system from among the one or more systems based on the decoded command; and
    forwarding the decoded command to the destination system.

(41) The method of one or more of (36) to (40), further comprising:
    generating and sending an acknowledgement to the selected ground station that the destination
    system performed a function in accordance with the command.

(42) The method of one or more of (36) to (41), wherein generating the acknowledgement includes encoding the acknowledgement.

(43) The method of one or more of (36) to (42), further comprising:
    collecting, by the destination system, satellite information in accordance with the command;
    scheduling transmission of the satellite information to one or more ground stations in the plurality of ground stations; and
    sending the satellite information to the one or more ground stations based on the scheduling.

(44) The method of one or more of (36) to (43), wherein the satellite information comprises telemetry information and/or payload data.

(45) The method of one or more of (36) to (44), further comprising: encoding the satellite information before sending the satellite information.

(46) The method of one or more of (36) to (45), wherein the command and acknowledgements associated with the command are sent over an S-band and/or other "communication link"/air interface, and wherein the satellite information is sent over an X-band and/or other "communication link"/air interface.

(47) The method of one or more of (36) to (46), wherein the type of transmission for the command is one of a unicast transmission to a single satellite of the one or more satellites, a multicast transmission to some but not all of the one or more satellites, and a broadcast transmission to all satellites of the one or more satellites.

(48) A satellite, comprising:
    a "communication link" interface; and
    at least one processor and at least one memory, wherein the at least one processor and the at least one memory are configured to support multiple tenant applications in a multi-tenancy cloud-computing environment and wherein two or more of the multiple tenant applications establish isolated "communication link" channels with a ground station utilizing the "communication link" interface.

(49) The satellite of (48), wherein a first tenant application in the two or more of the multiple tenant applications establishes a first "communication link" channel, wherein a second tenant application in the two or more of the multiple tenant applications establishes a second "communication link" channel, and wherein the first "communication link" channel utilizes a different security protocol than the second "communication link" channel.

(50) The satellite of one or more of (48) to (49), wherein the first "communication link" channel is at least one of encrypted and decrypted differently than the second "communication link" channel.

(51) The satellite of one or more of (48) to (50), wherein different encryption keys are used for the first "communication link" channel as compared to the second "communication link" channel.

(52) The satellite of one or more of (48) to (51), wherein the satellite is configured to transmit an emergency telecommand to another satellite.

(53) The satellite of one or more of (48) to (52), wherein the emergency telecommand is transmitted to the another satellite via a sidelink.

(54) The satellite of one or more of (48) to (53), wherein the emergency telecommand is transmitted to the another satellite via a ground station.

(55) The satellite of one or more of (48) to (54), wherein the emergency telecommand is transmitted autonomously.

(56) The satellite of one or more of (48) to (55), wherein at least one tenant application of the multiple tenant applications is configured to consume unallocated bandwidth from the "communication link" interface in response to detecting an emergency condition.

(57) The satellite of one or more of (48) to (56), wherein at least one tenant application of the multiple tenant applications is configured to offload a task to another satellite.

(58) The satellite of one or more of (48) to (57), wherein the task is offloaded by sending mission and/or task information to the another satellite via at least one of a ground station and a sidelink.

(59) The satellite of one or more of (48) to (58), wherein at least one tenant application of the multiple tenant applications shares information with another satellite and wherein the information comprises data selected from the following:

satellite ID current location and orbital parameters sidelink "communication link" parameter "Communication link" quality, available and allowed data bandwidth via sidelink "Communication link" quality, available and allowed data bandwidth from the neighbor satellite to GS "communication link" (download and/or upload)

satellite mission capabilities

Sharable Computing resource

Sharable Memory resources

Sharable Sensors, cameras, and any HW accelerators

Sharable Battery power resources

(60) The satellite of one or more of (48) to (59), wherein the information is shared via at least one of a sidelink and a ground station.

(61) The satellite of one or more of (48) to (60), wherein the information is also shared with a ground station.

(62) The satellite of one or more of (48) to (61), wherein data stored in the at least one memory, when processed by the at least one processor, enables the satellite to estimate a nearest and/or shortest sidelink path for a neighbor satellite based on orbital parameters of the neighbor satellite.

(63) The satellite of one or more of (48) to (62), wherein the orbital parameters include at least one of relative orbit time, relative orbit distant, and shortest network relay path.

(64) The satellite of one or more of (48) to (63), wherein data stored in the at least one memory, when processed by the at least one processor, enables the satellite to create and maintain a shortest/nearest "communication link" path table.

(65) The satellite of one or more of (48) to (64), wherein data stored in the at least one memory, when processed by the at least one processor, enables the satellite to perform ground station "communication link" scanning to identify a new ground station.

(66) The satellite of one or more of (48) to (65), wherein data stored in the at least one memory, when processed by the at least one processor, enables the satellite to perform satellite "communication link" scanning to identify new satellite neighbors.

(67) The satellite of one or more of (48) to (66), wherein data stored in the at least one memory, when processed by the at least one processor, enables the satellite to schedule multiple redundant transmissions of a telecommand via the "communication link" interface to a destination, wherein the multiple redundant transmissions of the telecommand are transmitted via different ground stations.

(68) The satellite of one or more of (48) to (67), wherein data stored in the at least one memory, when processed by the at least one processor, enables the satellite to identify a change in resource sharing and/or orbital parameters and "communication link" the change to at least one other satellite.

(69) A system, comprising:

a ground station; and a satellite, comprising:

a "communication link" interface; and at least one processor and at least one memory, wherein the at least one processor and the at least one memory are configured to support multiple tenant applications in a multi-tenancy cloud-computing environment, and wherein two or more of the multiple tenant applications establish isolated "communication link" channels with the ground station utilizing the "communication link" interface.

(70) A satellite, comprising:

a payload that generates payload data;

at least one processor; and at least one memory including data that enables the at least one processor to process commands from multiple users according to a same protocol, and access the payload data, the payload, or both based on the processed commands.

(71) The satellite of claim (59), wherein the satellite performs an internal monitoring of at least one of the Shareable Computing resources, the Shareable Memory resources, the Shareable Sensors, the cameras, the any HW accelerators, the payloads, the Shareable Battery power resources, and the multiple tenant applications, and wherein the satellite generates data associated with the internal monitoring and communicates the data with the one or more neighboring satellites through at least one of an intersatellite communication link (ISCL) and to the ground station through a ground communication link.

(72) The satellite of claim (59), wherein the satellite generates a routing table indicative of characteristics of a shortest communication link between the satellite and one or more of the one or more neighboring satellites, and wherein the satellite dynamically updates the routing table based on at least one of information received from one or more of the one or more neighboring satellites, information received from the ground station, and internal computation of the location of a neighbor satellite.

(73) The satellite of claim (59), wherein the satellite generates a routing table indicative of characteristics of a shortest communication link between the satellite and one or more of the ground stations via the neighboring satellite intersatellite communication link (ISCL), and wherein the satellite dynamically updates the routing table based on information received from one or more of the neighboring satellite and/or based on the information received from the one or more of the ground stations and or based on internal computation of the location of a neighbor satellite.

What is claimed is:

1. A satellite, comprising:

a communication link interface; and at least one processor and at least one memory including data that when executed by the at least one processor causes the at least one processor to support multiple tenant applications in a multi-tenancy cloud-computing environment, wherein two or more tenant applications of the multiple tenant applications establish isolated communication link channels with a ground station utilizing the communication link interface, wherein a first tenant application in the two or more tenant applications establishes a first communication link channel, wherein a second tenant application in the two or more tenant applications establishes a second communication link channel, and wherein the first communication link channel utilizes a different security protocol than the second communication link channel, and wherein the satellite is configured to transmit an emergency telecommand to another satellite.

2. The satellite of claim 1, wherein the first communication link channel is at least one of encrypted and decrypted differently than the second communication link channel.

3. The satellite of claim 1, wherein different encryption keys are used for the first communication link channel as compared to the second communication link channel.

4. The satellite of claim 1, wherein the emergency telecommand is transmitted to the another satellite via a sidelink.

5. The satellite of claim 1, wherein the emergency telecommand is transmitted to the another satellite via the ground station.

6. The satellite of claim 1, wherein the emergency telecommand is transmitted autonomously.

7. The satellite of claim 1, wherein at least one tenant application of the multiple tenant applications is configured to consume unallocated bandwidth from the communication link interface in response to detecting an emergency condition.

8. The satellite of claim 1, wherein at least one tenant application of the multiple tenant applications is configured to offload a task to a second satellite.

9. The satellite of claim 8, wherein the task is offloaded by sending mission and/or task information to the second satellite via at least one of the ground station and a sidelink.

10. The satellite of claim 1, wherein at least one tenant application of the multiple tenant applications shares information with one or more neighboring satellites, and wherein the information comprises data selected from the following:
   satellite ID;
   current location and orbital parameters;
   sidelink communication link parameter;
   communication link quality, available and allowed data bandwidth via sidelink;
   communication link quality, available and allowed data bandwidth from a neighboring satellite to ground station communication link (download and/or upload);
   satellite mission capabilities;
   Sharable Computing resources;
   Sharable Memory resources;
   at least one of Sharable Sensors, cameras, any hardware (HW) accelerators, and payloads; or
   Sharable Battery power resources.

11. The satellite of claim 1, wherein the at least one memory includes data that when executed by the at least one processor causes the at least one processor to:
   perform an internal monitoring of at least one of Shareable Computing resources, Shareable Memory resources, Shareable Sensors, cameras, HW accelerators, payloads, Shareable Battery power resources, or the multiple tenant applications; and
   generate data associated with the internal monitoring and communicates the generated data with one or more neighboring satellites through at least one of an inter-satellite communication link (ISCL) and to the ground station through a ground communication link.

12. The satellite of claim 1, wherein the at least one memory includes data that when executed by the at least one processor causes the at least one processor to:
   generate a routing table indicative of characteristics of a shortest communication link between the satellite and one or more neighboring satellites; and
   dynamically update the routing table based on at least one of information received from the one or more neighboring satellites, information received from the ground station, or internal computation of a location of a neighboring satellite.

13. The satellite of claim 1, wherein the at least one memory includes data that when executed by the at least one processor causes the at least one processor to:
   generate a routing table indicative of characteristics of a shortest communication link between the satellite and the ground station via a neighboring satellite intersatellite communication link (ISCL); and
   dynamically update the routing table based on information received from one or more neighboring satellites and/or based on information received from the ground station and/or based on internal computation of a location of the neighboring satellite.

14. The satellite of claim 10, wherein the information is shared via at least one of a sidelink and the ground station.

15. The satellite of claim 10, wherein the information is also shared with the ground station.

16. The satellite of claim 1, wherein the at least one memory includes data that when executed by the at least one processor causes the at least one processor to:
   estimate a nearest and/or shortest sidelink path for a neighbor satellite based on orbital parameters of the neighbor satellite.

17. The satellite of claim 16, wherein the orbital parameters include at least one of relative orbit time, relative orbit distance, or shortest network relay path.

18. The satellite of claim 1, the at least one memory includes data that when executed by the at least one processor causes the at least one processor to:
   create and maintain a shortest/nearest communication link path table.

19. The satellite of claim 1, the at least one memory includes data that when executed by the at least one processor causes the at least one processor to:
   perform ground station communication link scanning to identify a new ground station or to identify new satellite neighbors.

20. A system, comprising:
   a ground station; and
   a satellite, comprising:
      a communication link interface; and
      at least one processor and at least one memory including data that when executed by the at least one processor causes the at least one processor to support multiple tenant applications in a multi-tenancy cloud-computing environment, and wherein two or more tenant applications of the multiple tenant applications establish isolated communication link channels with the ground station utilizing the communication link interface,
   wherein a first tenant application in the two or more tenant applications establishes a first communication link channel, wherein a second tenant application in the two or more tenant applications establishes a second communication link channel, and wherein the first communication link channel utilizes a different security protocol than the second communication link channel, and wherein the satellite is configured to transmit an emergency telecommand to another satellite.

21. A satellite, comprising:

a payload that generates payload data;

at least one tenant application;

at least one processor; and at least one memory including data that when executed by the at least one processor causes the at least one processor to;

process commands from multiple users according to a same protocol, and access the payload data, the payload, or both based on the processed commands;

generate a routing table indicative of characteristics of a shortest communication link between the satellite and one or more neighboring satellites; and dynamically update the routing table based on at least one of information received from the one or more neighboring satellites, information received from a ground station, or internal computation of a location of the one or more neighboring satellites, wherein the satellite is configured to transmit an emergency telecommand to another satellite.

\* \* \* \* \*